(12) United States Patent
Divan

(10) Patent No.: US 9,270,170 B2
(45) Date of Patent: Feb. 23, 2016

(54) VOLTAGE SAG CORRECTOR USING A VARIABLE DUTY CYCLE BOOST CONVERTER

(75) Inventor: Deepakraj Malhar Divan, San Jose, CA (US)

(73) Assignee: INNOVOLT, INC., Atlanta, GA (US)

( * ) Notice: Subject to any disclaimer, the term of this patent is extended or adjusted under 35 U.S.C. 154(b) by 766 days.

(21) Appl. No.: 13/449,870

(22) Filed: Apr. 18, 2012

(65) Prior Publication Data

US 2012/0262140 A1  Oct. 18, 2012

Related U.S. Application Data

(60) Provisional application No. 61/476,532, filed on Apr. 18, 2011.

(51) Int. Cl.
*G05F 1/00* (2006.01)
*H02M 3/156* (2006.01)
*H02M 1/00* (2007.01)

(52) U.S. Cl.
CPC ...... *H02M 3/156* (2013.01); *H02M 2001/0022* (2013.01)

(58) Field of Classification Search
USPC ............. 323/223, 282, 351; 307/64, 65
See application file for complete search history.

(56) References Cited

U.S. PATENT DOCUMENTS

| 3,109,930 A | 11/1963 | MacDonald |
| 3,558,952 A | 1/1971 | Forbes |
| 3,935,511 A | 1/1976 | Boulanger et al. |
| 3,935,527 A | 1/1976 | Michelet et al. |
| 3,982,137 A | 9/1976 | Penrod |
| 4,031,463 A | 6/1977 | Norberg |
| 4,183,071 A | 1/1980 | Russell |
| 4,250,531 A | 2/1981 | Ahrens |
| 4,328,459 A | 5/1982 | McLeod, Jr. |

(Continued)

FOREIGN PATENT DOCUMENTS

| EP | 0 708 515 A1 | 4/1996 |
| EP | 0 986 158 A1 | 3/2000 |

(Continued)

OTHER PUBLICATIONS

Int'l Search Rpt & WO, Mar. 13, 2006, Int'l Searching Authority.

(Continued)

*Primary Examiner* — Adolf Berhane
*Assistant Examiner* — Afework Demisse
(74) *Attorney, Agent, or Firm* — Morris, Manning & Martin, LLP; John R. Harris

(57) ABSTRACT

A sag corrector apparatus for providing voltages temporarily (ride-through) to a load during momentary electrical disturbances in the power supply line. In one embodiment, the disclosed apparatus compensates for voltage sags by using a variable duty cycle boost converter to boost the sagged line voltage to resemble desired voltage levels during occurrence of voltage sags. The boosted voltage available to a connected load during a sag depends on a sequence of operation of various control pulses. Duty cycle of the boost converter is controlled by changing the width (duration) of the control pulses. To prevent voltage shoot-throughs from over-boosting, an energy clamp circuit is provided to dissipate excess energy. Embodiments of the sag corrector circuit can be additionally integrated with power protection functions.

78 Claims, 7 Drawing Sheets

BLOCK DIAGRAM OF VOLTAGE SAG CORRECTOR CIRCUIT

(56) References Cited

U.S. PATENT DOCUMENTS

| | | | |
|---|---|---|---|
| 4,396,882 A | 8/1983 | Kellenbenz |
| 4,479,118 A | 10/1984 | Cole, Jr. |
| 4,555,741 A | 11/1985 | Masaki |
| 4,560,887 A | 12/1985 | Schneider |
| 4,675,772 A | 6/1987 | Epstein |
| 4,691,274 A | 9/1987 | Matouk et al. |
| 4,782,241 A | 11/1988 | Baker et al. |
| 4,858,054 A | 8/1989 | Franklin |
| 4,924,342 A | 5/1990 | Lee |
| 4,939,437 A | 7/1990 | Farag et al. |
| 5,030,844 A | 7/1991 | Li et al. |
| 5,032,738 A | 7/1991 | Vithayathil |
| 5,063,303 A | 11/1991 | Sackman et al. |
| 5,117,176 A | 5/1992 | Bobry |
| 5,257,157 A | 10/1993 | Epstein |
| 5,379,177 A | 1/1995 | Bird |
| 5,386,183 A | 1/1995 | Cronvich et al. |
| 5,418,678 A | 5/1995 | McDonald |
| 5,448,442 A | 9/1995 | Farag |
| 5,519,264 A | 5/1996 | Heyden et al. |
| 5,519,295 A | 5/1996 | Jatnieks |
| 5,537,021 A | 7/1996 | Weinberg et al. |
| 5,563,459 A | 10/1996 | Kurosawa et al. |
| 5,619,127 A | 4/1997 | Warizaya |
| 5,627,738 A | 5/1997 | Lubomirsky et al. |
| 5,642,007 A | 6/1997 | Gyugyi et al. |
| 5,689,395 A | 11/1997 | Duffy et al. |
| 5,737,161 A | 4/1998 | Thomas |
| 5,745,322 A | 4/1998 | Duffy et al. |
| 5,864,458 A | 1/1999 | Duffy et al. |
| 5,886,429 A | 3/1999 | Grady et al. |
| 5,894,396 A | 4/1999 | Kim |
| 5,907,192 A | 5/1999 | Lyons et al. |
| 6,005,362 A | 12/1999 | Enjeti et al. |
| 6,021,035 A | 2/2000 | Larsen et al. |
| 6,046,921 A | 4/2000 | Tracewell et al. |
| 6,112,136 A | 8/2000 | Paul et al. |
| 6,118,676 A | 9/2000 | Divan et al. |
| 6,163,469 A | 12/2000 | Yuki |
| 6,178,080 B1 | 1/2001 | Wilken et al. |
| 6,184,593 B1 | 2/2001 | Jungreis |
| 6,456,097 B1 | 9/2002 | Sutherland |
| 6,538,864 B2 | 3/2003 | Mullner |
| 6,597,144 B2 | 7/2003 | Pearson et al. |
| 6,621,668 B1 | 9/2003 | Sare |
| 6,630,751 B2 | 10/2003 | Curtis et al. |
| 6,744,612 B2 | 6/2004 | Chen |
| 6,744,613 B2 | 6/2004 | McCook et al. |
| 6,862,201 B2 | 3/2005 | Hodge, Jr. |
| 7,012,793 B2 | 3/2006 | Cheevanantachai et al. |
| 7,049,710 B2 | 5/2006 | Dahlman |
| 7,099,135 B2 | 8/2006 | Ball et al. |
| 7,102,340 B1 * | 9/2006 | Ferguson ............ H02M 3/157 323/282 |
| 7,184,279 B2 | 2/2007 | Lee |
| 7,355,294 B2 | 4/2008 | Teichmann |
| 7,504,821 B2 | 3/2009 | Shuey |
| 7,525,777 B2 | 4/2009 | Aromin |
| 7,541,696 B2 | 6/2009 | Dawley |
| 7,630,185 B2 | 12/2009 | Fiesoli et al. |
| 7,957,117 B2 | 6/2011 | Divan et al. |
| 7,977,928 B2 | 7/2011 | Fahrenbruch |
| 8,035,938 B2 | 10/2011 | Divan |
| 2001/0021091 A1 | 9/2001 | Weichler |
| 2002/0012261 A1 | 1/2002 | Moindron |
| 2002/0122318 A1 | 9/2002 | Guerrera |
| 2002/0149891 A1 | 10/2002 | Neiger et al. |
| 2003/0052658 A1 | 3/2003 | Baretich et al. |
| 2003/0107859 A1 | 6/2003 | Pan et al. |
| 2003/0222747 A1 | 12/2003 | Perkinson et al. |
| 2004/0017110 A1 | 1/2004 | Yim |
| 2004/0070278 A1 | 4/2004 | Divan et al. |
| 2004/0201931 A1 | 10/2004 | Korcharz et al. |
| 2005/0088792 A1 | 4/2005 | Mechanic et al. |
| 2008/0197819 A1 | 8/2008 | Thompson et al. |
| 2010/0091421 A1 | 4/2010 | Lee |
| 2010/0195258 A1 | 8/2010 | Yang |

FOREIGN PATENT DOCUMENTS

| | | |
|---|---|---|
| EP | 0 862 261 B1 | 1/2004 |
| FR | 2 197 258 | 3/1974 |
| GB | 1076078 | 7/1967 |
| GB | 2284100 | 5/1995 |
| JP | 61-77634 | 5/1986 |
| JP | 05-049167 | 2/1993 |
| JP | 05-252650 A | 9/1993 |
| JP | 2001-025256 | 1/2001 |
| JP | 2001-136657 | 5/2001 |
| JP | 2003-259648 | 9/2003 |
| JP | 2004-304876 | 10/2004 |
| WO | WO 00/59087 A1 | 10/2000 |

OTHER PUBLICATIONS

Duran-Gomez, Jose Luis, et al., An Approach to Achieve Ride-Through of an Adjustable-Speed Drive with Flyback Converter Modules Powered by Super Capacitors, IEEE Transactions on Industry Applications, Mar./Apr. 2002, pp. 514-522, vol. 38, No. 2, IEEE, USA.

Electrotek, Voltage Sag Studies, http://www.electrotek.com/voltsag.htm, Feb. 16, 2006, pp. 1-5, Electrotek Concepts, USA.

Fischer, F. V., Applied Power Electronics in the Field of Voltage Dip-Proofing, http://www.measurlogic.com/Resources/PowerQuality_book.pdf, May 16, 2002, pp. 1-12, Dip-Proofing Technologies Inc., USA.

Stratford, J., et al., Applying Voltage Dip Proofing to Provide Ride-Through, http://www.electricenergyonline.com/?page=show_article&mag=11&articie=81, Feb. 2003, pp. 1-8, Electric Energy Publications Inc., USA.

* cited by examiner

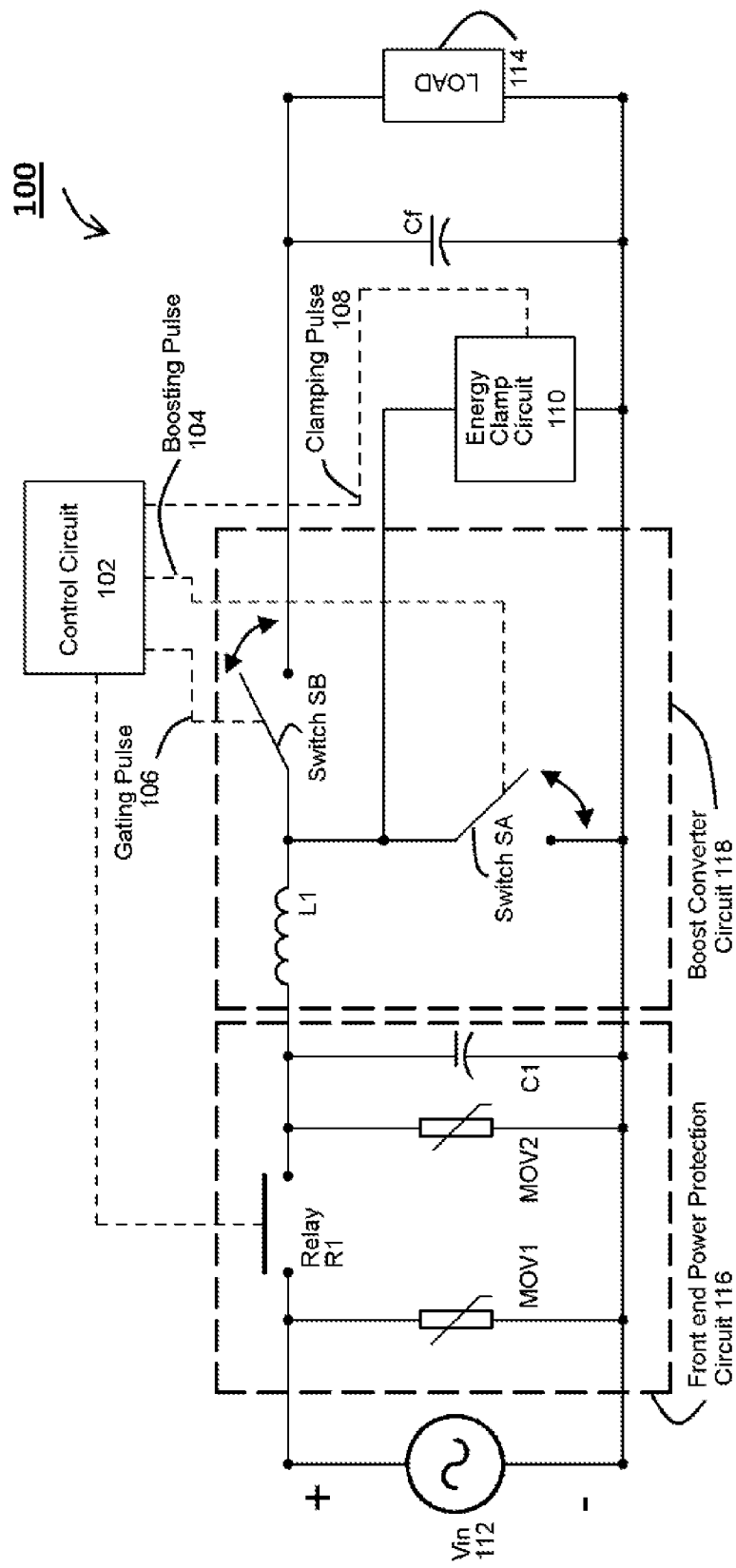
*FIG 1.* BLOCK DIAGRAM OF VOLTAGE SAG CORRECTOR CIRCUIT

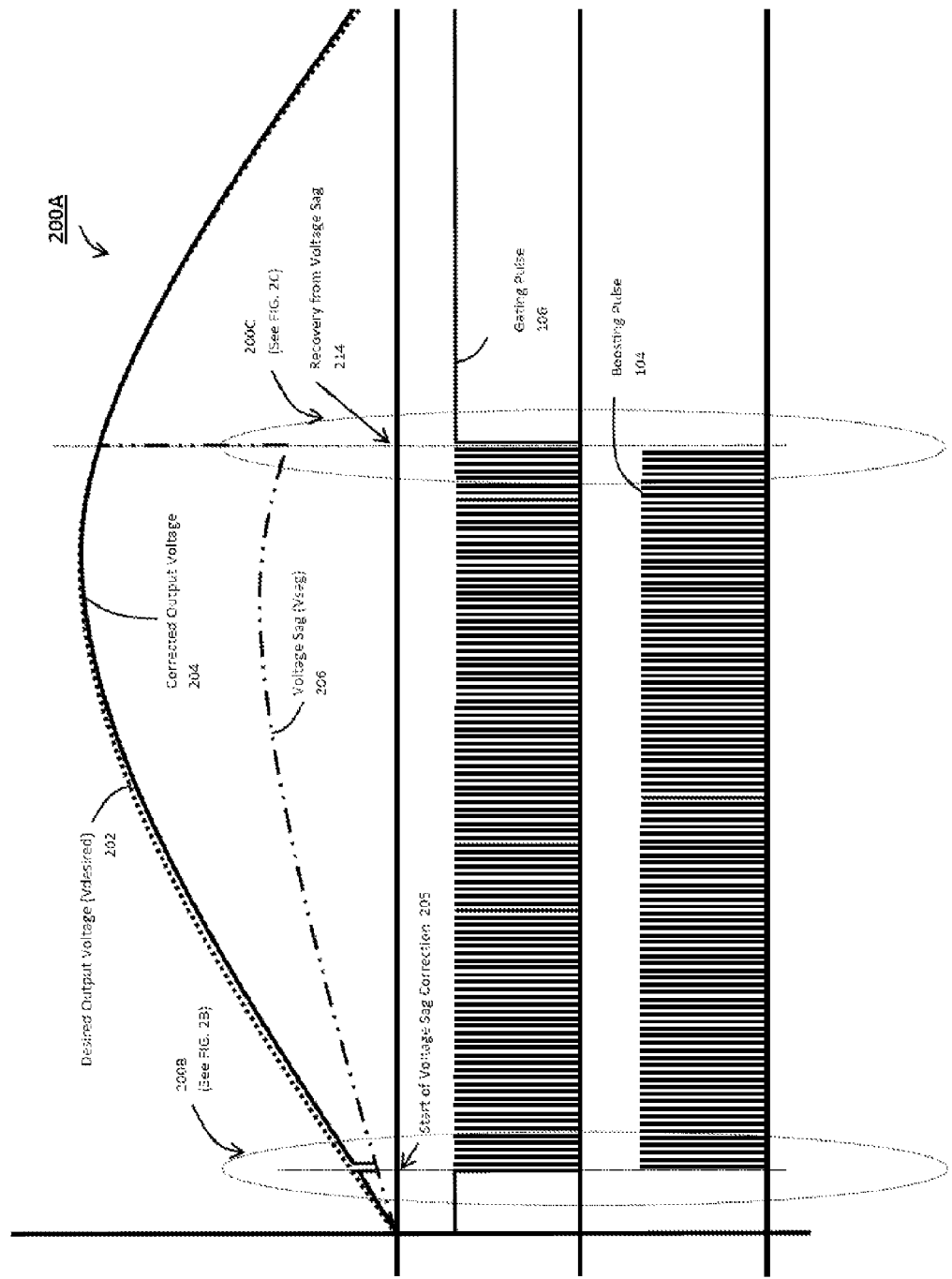
FIG 2A. EXEMPLARY VOLTAGE WAVEFORMS

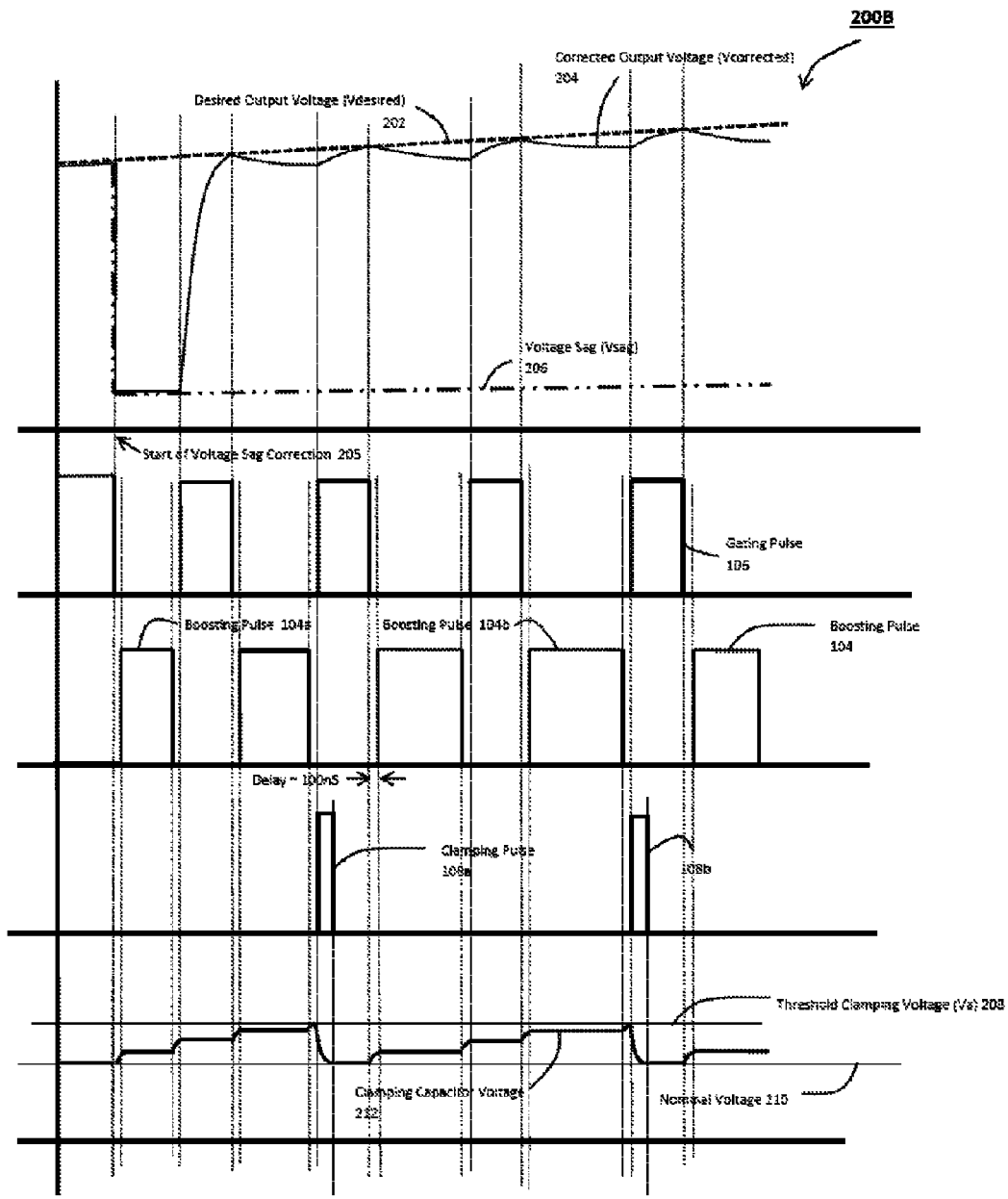
FIG 2B. EXEMPLARY VOLTAGE WAVEFORMS, BOOSTING PULSES, GATING PULSES, AND CLAMPING PULSES DURING SAG CORRECTION

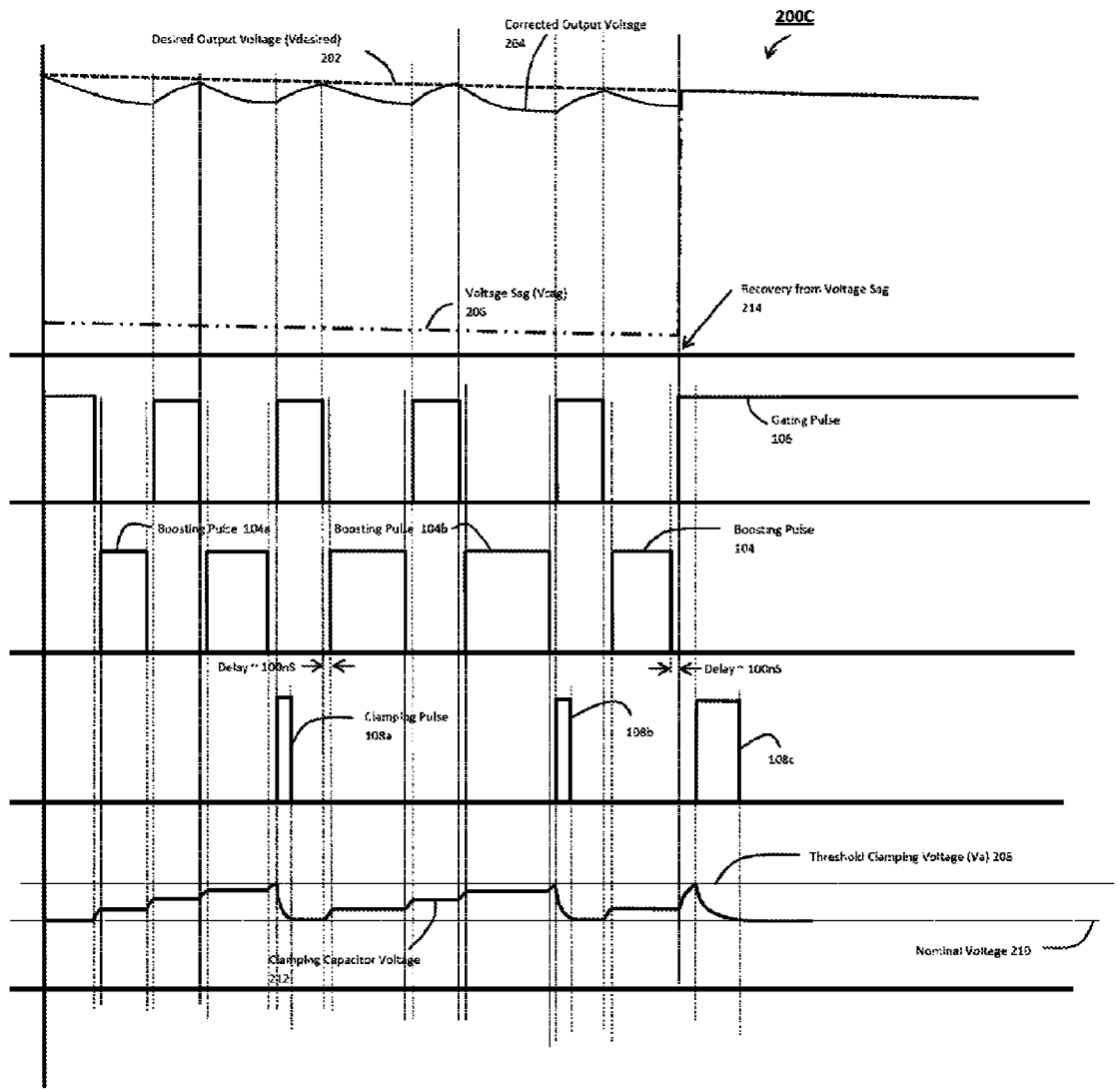
FIG 2C. EXEMPLARY VOLTAGE WAVEFORMS, BOOSTING PULSES, GATING PULSES, AND CLAMPING PULSES DURING SAG RECOVERY

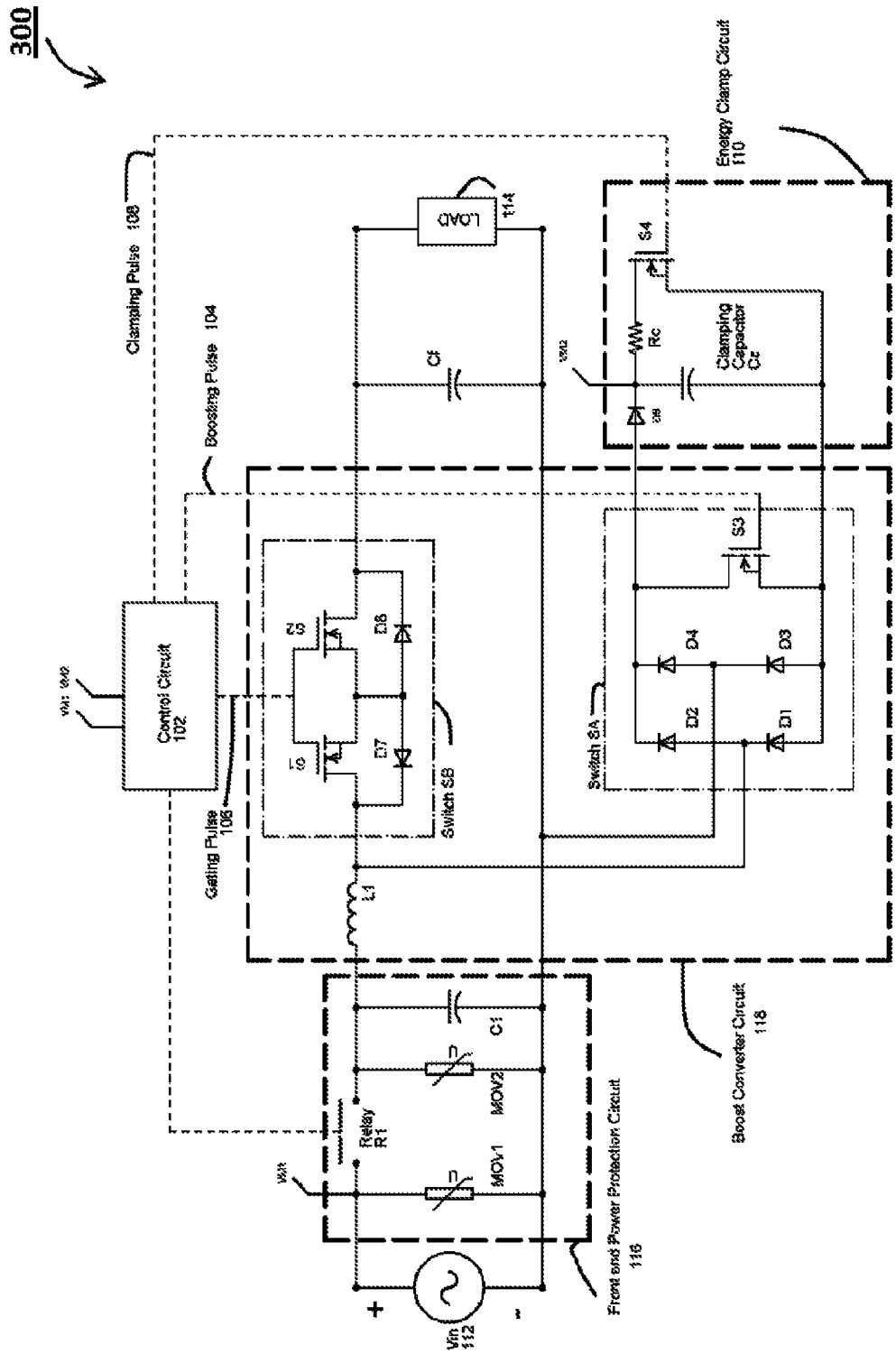
FIG 3. EXEMPLARY VOLTAGE SAG CORRECTOR CIRCUIT EMBODIMENT

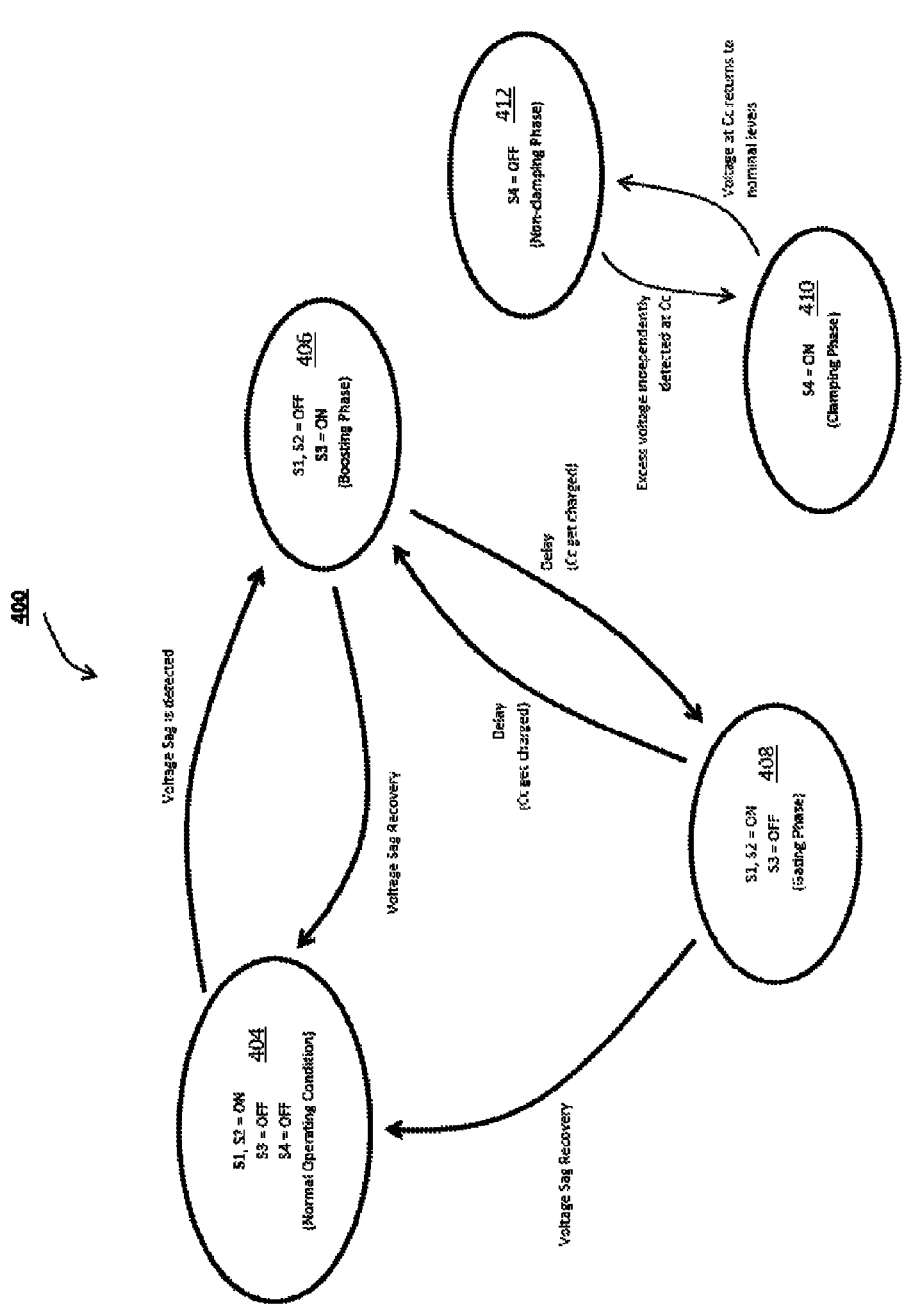
FIG 4. STATE DIAGRAM OF REPRESENTATION OF SWITCHES S1, S2, S3, AND S4 (SHOWN IN FIG.3 EMBODIMENT)

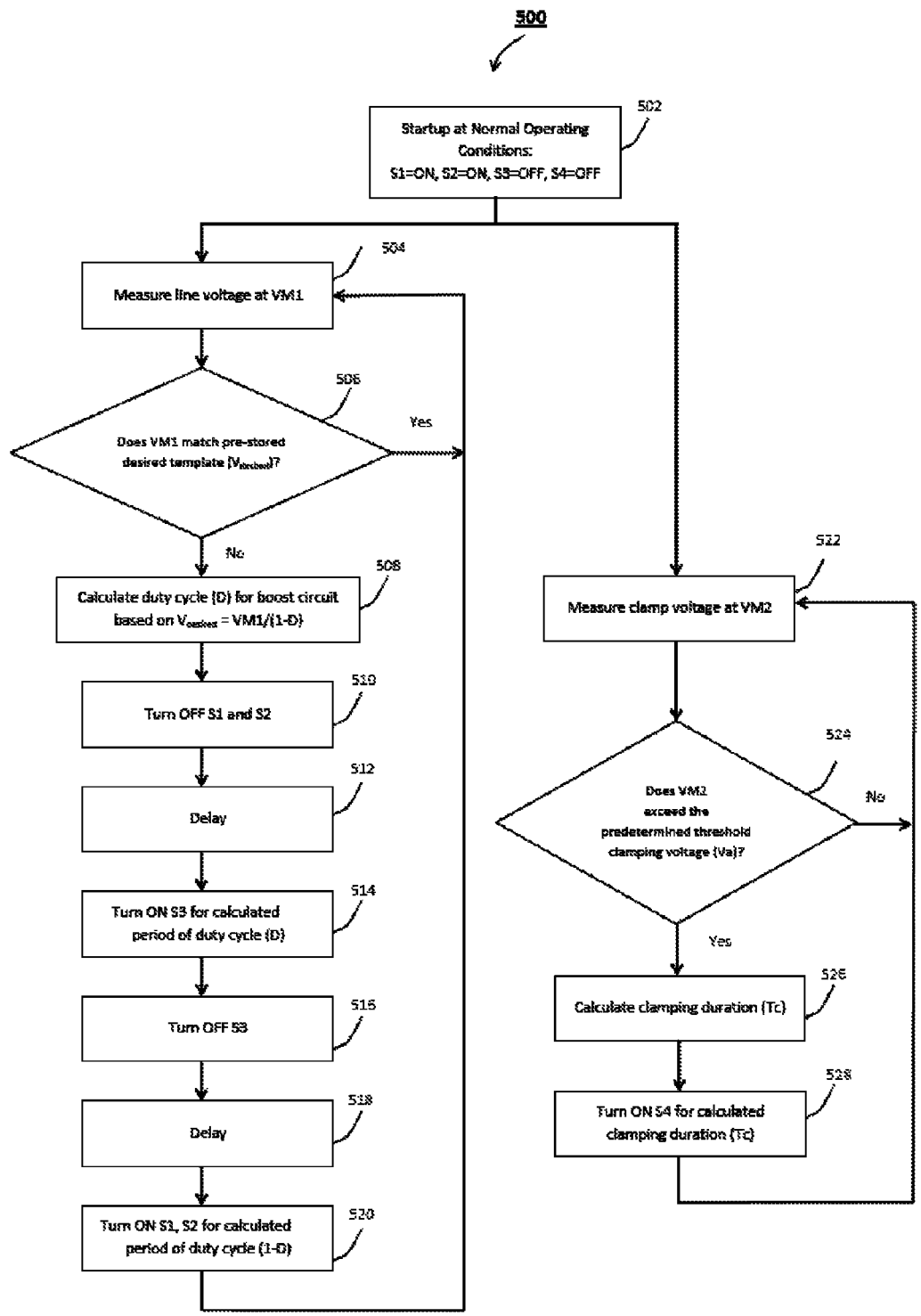
FIG 5. EXEMPLARY CONTROL CIRCUIT PROCESS

VOLTAGE SAG CORRECTOR USING A VARIABLE DUTY CYCLE BOOST CONVERTER

CROSS REFERENCE TO RELATED APPLICATION

This application claims benefit under 35 U.S.C. §119(e) of U.S. Provisional Patent Application No. 61/476,532 filed Apr. 18, 2011, and entitled "Voltage Sag Corrector," which is incorporated herein by reference as if set forth herein in its entirety.

TECHNICAL FIELD

The present disclosure relates generally to providing voltages temporarily to a load during momentary electrical disturbances in the power supply line, and more particularly relates to an apparatus that compensates for voltage sags by using a variable duty cycle boost converter to boost the line voltage to predetermined desired voltage levels during occurrence of the voltage sags (a/k/a momentary electrical disturbances), thereby maintaining uptime and productivity across a connected load.

BACKGROUND

The five commonly observed power supply line disturbances are voltage surges, voltage sags, overvoltage, undervoltage, and brownouts. Of these, voltage sags account for 90-95% of events, particularly in commercial and industrial facilities. Voltage sags are voltage reductions in the nominal line voltage. Typically, voltage sags are characterized by drops of between 10%-90% of nominal (system) line voltages. The drops in voltage typically last from a cycle (16.6 millisecond) to a second or so, or tens of milliseconds to hundreds of milliseconds.

The reason for occurrence of voltage sags can be due to faults on the grid, and also due to high starting currents drawn by electrical loads (e.g., motors, refrigerators, freezers, air conditioners, etc.) at startup. Another reason for occurrence of voltage sags is faults in the power provider's transmission or distribution lines. Voltage sags occurring at high voltages typically spread through the electrical utility network and are transmitted to lower voltage systems via line transformers. Additionally, voltage sags can occur frequently in some locations that experience severe weather phenomenon such as lightning, wind, and ice. For example, lightning strikes a power line and continues to ground, which results in a line-to-ground fault. The line-to-ground fault in turn creates a voltage sag and this reduced voltage can be seen over a wide area. The amplitude of a voltage sag is the value of the instantaneous line voltage during a voltage sag. Generally, voltage sags are followed by a short duration increase (i.e. inrush) in the line current upon to nominal voltage levels due to discharge of reactive impedance in the load during the sag.

Power protection equipment to date has focused primarily on protecting downstream (i.e. from the perspective of the power supply) electrical equipment from damage. Further, since typical power protectors are simple inexpensive electrical devices, having little or no power electronics for fast dynamic control, these devices have not been used to provide ride-through during an electrical line disturbance. Examples of typical power protectors include (but are not limited to) Metal Oxide Varistors (MOVs), relays, thermistors such as Negative Temperature Coefficient (NTC) thermistors or Positive Temperature Coefficient (PTC) thermistors, etc.

For example, MOVs are used for protection against lightning strikes. NTC thermistors or PTC thermistors are inserted for protection against inrush current, and relays are used to cut out equipment in case of damaging overvoltage events. However, neither relays nor thermistors are able to provide ride through functionality. Ride through functionality involves providing temporary electrical energy to synthesize normal operating conditions for a connected load or electrical equipment, during the occurrence of momentary electrical disturbances such as voltage sags. Such a functionality can be provided by a single device, or a combination of electrical components connected in a certain arrangement. A ride-through device that is in common use is an uninterruptible power supply (UPS), or a voltage sag corrector, such as the dynamic sag corrector. However, these devices generally do not provide any protection functionality.

Therefore, it can be appreciated that what is needed is a device that protects against common disturbances and also allows the machine/load/equipment to keep operating through frequently occurring disturbances (e.g., voltage sags). Voltage sags are voltage reductions in the line voltage.

From various electrical power grid measurements, it has been determined that voltage sags are statistically distributed in a manner such that a vast majority of sags retain at least 50% of the nominal line voltage value and last no more than 2-3 seconds. Conventionally, a typical sag correction device would involve the use of an inverter to inject the additional voltage needed, during the occurrence of a voltage sag, with a normal bypass arrangement to restore back to normal operating line conditions when the sag is over. However, such sag correction devices are typically very expensive.

Another possibility is to use an ac chopper arrangement to boost the incoming line voltage to an appropriate value. Such a boost converter arrangement is well known to practicing engineers. However, boost converters suffer from a significant limitation in terms of speed of response—driven by a 'right half plane' zero in the control characteristics. Further, the need for gate drives and control logic to interconnect each element of the ac switches, adds to cost and 'real estate' in a product that is preferred to be compact and low-cost.

What is proposed in this disclosure is a low-cost arrangement of transient voltage surge protection devices such as MOVs, relays for sustained overvoltage and under-voltage protection, and an arrangement of semiconductor devices such as MOSFETs and diodes—along with their control, power supply and gate drive circuits, that provide protection against the common disturbances, as well as ride-through for connected equipment, in the presence of frequently occurring power disturbances—i.e. voltage sags. Thus, there is clearly a need for a combined inexpensive device that integrates protection and ride-through functions and does so without sacrificing the cost of the typical power protector.

BRIEF SUMMARY

Briefly described and according to one aspect, the present disclosure relates to a system for providing temporary electrical power to a load connected to an input AC line voltage during a voltage sag. The disclosed system includes a selectively actuatable boost converter for providing a boosted voltage to the load. Also provided is a circuit for detecting a voltage sag in the input AC line voltage corresponding to a value in a predetermined range of values in the input AC line voltage less than a nominal voltage for the input AC line voltage and for actuating the boost converter and for detecting when the voltage sag is over. Also included is at least one switch for coupling the input AC line voltage to the electrical load during normal operating conditions and for coupling the boost converter to the electrical load in response to detection of a voltage sag. Further, the system includes a clamping circuit coupled to the boost converter for clamping excess voltage from the boost converter when the boost converter is turned off in response to detection that the voltage sag is over.

According to another aspect, there is disclosed a method for providing temporary electrical power to a load connected to an input AC line voltage during a voltage sag. Steps of the disclosed method include:

(1) detecting a voltage sag in the input AC line voltage corresponding to a value in a predetermined range of values in the input AC line voltage less than a nominal voltage for the input AC line voltage;
(2) actuating a selectively actuatable boost converter to provide a boosted voltage to the load;
(3) detecting the end of the voltage sag; and
(4) in response to detection that the voltage sag is over, turning off the boost converter and clamping excess voltage from the boost converter to a clamping circuit so as to prevent the excess voltage from being transmitted to the load.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more non-limiting and non-exhaustive embodiments of the present disclosure, and, together with the written description, serve to explain the principles of the disclosure. Wherever possible, the same reference numbers are used throughout the drawings to refer to the same or like elements of an embodiment, and wherein:

FIG. 1 shows a block diagram of a sag corrector circuit, according to one embodiment of the present disclosure.

FIG. 2 (consisting of FIG. 2A, FIG. 2B, and FIG. 2C) shows exemplary output voltage (appearing across the electrical load) waveforms, and timing diagrams of associated switches, when a sag occurs in the input AC line voltage.

FIG. 3 shows an exemplary sag corrector circuit, according to one embodiment of the present disclosure.

FIG. 4 shows a state diagram representation of various switches used in connection with the FIG. 3 embodiment.

FIG. 5 is a flowchart showing an exemplary microprocessor-implemented process 500 corresponding to various steps executed in the microprocessor logic as followed in the embodiment shown in FIG. 3.

DETAILED DESCRIPTION OF DISCLOSED EMBODIMENTS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure relate to devices and methods that provide voltages temporarily to a load during momentary electrical disturbances (e.g., voltage sags) in the power supply line. According to one aspect, the disclosed device is a sag corrector circuit comprising a variable duty cycle boost converter circuit that provides the boost necessary to compensate for voltage sags. According to another aspect, the excess energy obtained via the boost converter is dumped to an energy clamp circuit coupled to the sag corrector circuit.

Referring now to the figures, FIG. 1 illustrates a block diagram of an embodiment 100 of an exemplary sag corrector circuit. As shown, the disclosed sag corrector circuit connects the input AC line voltage ($V_{in}$) 112 to the load 114. In the embodiment shown, the sag corrector circuit comprises a front end power protection circuit 116, a boost converter circuit 118, an energy clamp circuit 110, a control circuit 102, and a filter capacitor Cf connected across the load.

Typically, the front end power protection circuit 116 includes non-linear circuit components such as varistors and other circuit components (e.g., relays etc.) for responding to power line disturbances such as over-voltages, sags, etc. According to one aspect, the front end power protection circuit 116 includes a MOV 1 with a higher voltage rating, a MOV2 with a lower voltage rating, and a relay R1 coupled between the two MOVs.

Coupled to the front end protection circuit 116 is a boost converter circuit 118 that comprises an inductor L1 connected (in series to the input AC line voltage) with a switch SB, and another switch SA. The switch SA is oriented in a manner such that one terminal of the switch SA is connected to the inductor L1 and the other terminal is connected in line with the neutral point of the input AC line voltage, e.g. the switch SA is connected in a parallel orientation to the load 114. The configuration for the inductor L1 and switches SA and SB will be known to one skilled in the art on boost converters. Further, as will also be well known to people skilled in the art, the output voltage of the boost converter (e.g., the load voltage) is controlled by varying the duty cycle of the switches SA and SB in a manner dependent on the instantaneous value of the input AC line voltage and a pre-stored desired (target) voltage. (Details of operation of switches SA and SB will be discussed later herein.) According to an aspect of the invention(s) as described herein, the varying of the duty cycle is effected using a pulse width modulation (PWM) scheme, at a predetermined boosting frequency.

In parallel arrangement with the front end power protection circuit 116 is a capacitor C1. As will be understood, the capacitor C1 (in conjunction with other circuit components of FIG. 1) enables the sag corrector to provide functionalities of an EMI/RFI filter.

An energy clamp circuit 110 is connected across the switch SA so that the outcome of the boost converter operation of "boosting voltage levels" does not cause the load voltage to exceed safe limits of operation. In other words, the sag corrector circuit 100 diverts current from the inductor L1 into the energy clamp circuit 110 to prevent load voltages from exceeding safe limits. In one embodiment, the energy clamp circuit 110 dissipates excess energy when actuated by clamping pulses 108. The energy clamp circuit 110 shown in FIG. 1 is for illustrative purposes. In one example, the energy clamp circuit 110 involves a capacitor, a resistor, diodes, and a MOSFET switch. An alternate embodiment of the energy clamp circuit with a reduced component count (e.g., with lesser number of diodes than that will be required for FIG. 1 embodiment) will be discussed exemplarily in connection with FIG. 3. As FIG. 1 is a block diagram intended to provide a general overview of the functionality of the voltage sag corrector circuit 100, it does not show requisite components seen in the detailed diagram in FIG. 3 and other circuit components.

As shown in FIG. 1, the boost converter circuit 118 (whose output is connected in parallel to capacitor Cf) is generally controlled by the control circuit 102 via gating pulses 106 and boosting pulses 104. According to aspects of the present disclosure, the duty cycle of the boost converter 118 is regulated by varying the width of the gating and boosting pulses in a manner dependent on the instantaneous value of the input AC line voltage and a pre-stored desired (target) voltage. With reference to FIG. 1, the gating pulse 106 controls the operation of the switch SB, and the boosting pulse 104 controls the operation of the switch SA. During a boosting phase, switch SA is turned on via boosting pulses 104, causing energy to be stored in the inductor L1 in the form of magnetic flux. During a successive gating phase, the control circuit 102 provides gating pulses to the switch SA while the boosting pulse 104 is turned off. As will be understood, the sequence of operation of switches SA and SB is such that the inductor L1 and the capacitor Cf charge and discharge alternately. Specifically, while the inductor L1 is charging during a boosting phase, the capacitor Cf (connected in parallel to the load 114) is discharging through the load 114. Similarly, the capacitor Cf charges during a gating phase from the energy transferred by the inductor L1 to the capacitor Cf. Exemplary waveforms showing a voltage sag as well as sequence of operation of the gating pulse 106 and boosting pulse 104 will be discussed in connection with FIG. 2A, FIG. 2B, and FIG. 2C. Specific examples characterizing particular circuit components that comprise the boost converter circuit 118 and the energy clamp circuit 110 will be explained in connection with FIG. 3. Details of method steps implemented by the logic in the control circuit 102 will be explained in connection with FIG. 4.

As will be understood and appreciated, the inductor L1 behaves like a short circuit during normal operation of the sag corrector circuit, i.e. when no voltage sags occur. In one example (not shown herein), the control circuit 102 detects and further starts taking corrective action after about a quarter of an AC cycle following the onset of a voltage sag. According to aspects as described herein, the corrective action comprises the control circuit 102 turning off switch SB (e.g., turning off the gating pulse 106) and simultaneously turning on switch SA via boosting pulse 104. As a result, the load gets disconnected from the input AC line momentarily. During a successive time interval, the boosting pulse 104 is turned off while the gating pulse 106 is turned on, and this process is performed repetitively, until the sag is over. According to aspects described herein, a predetermined delay is provided between successive gating and boosting pulses.

When the input AC line voltage returns to a nominal value at the end of a voltage sag, rapid action is required to ensure that the load voltage does not exceed safe limits. This is accomplished by the control circuit 102 detecting a return of the AC line voltage to normalcy, and a rapid turn-off of switch SA and turn-on of SB, with a pre-determined delay between the turn-off and turn-on. During the predetermined delay (as mentioned above), current flowing through the inductor L1 is diverted into the energy clamp circuit 110. Details of operation of the energy clamp circuit 110 will be explained in connection with FIG. 2A, FIG. 2B, FIG. 2C, and FIG. 3. As will be understood, if no voltage sags are detected in the input AC line voltage, the control circuit 102 in the sag corrector circuit keeps monitoring the input AC line voltage with switch SB turned on and switch SA turned off.

Before proceeding further, it is noted herein that although the present disclosure discusses a sag corrector circuit connected to an electrical load, it will be understood that in alternate embodiments, the sag corrector circuit can be implemented in different circuit elements depending on the requirements of the connected load. For example, a sag corrector circuit can be integrated with electrical power supplies such as switched mode power supplies (SMPS) inside electronic devices, power protection strips or surge protectors, and various other circuit elements as will occur to those skilled in the art. For example, according to one aspect, the front end power protection circuit can be designed to handle various power line disturbances (e.g., voltage surges and overvoltage events) using a combination of circuit components and associated microprocessor logic. Details of systems and methods involved in voltage surges and overvoltage events have been disclosed in U.S. Pat. No. 7,957,117 issued Jun. 7, 2011, which is incorporated herein by reference. Exemplary output voltage waveforms and pulses (e.g., various types of control signal) provided by the control circuit in an exemplary sag corrector circuit will be described next.

Now referring to FIG. 2 (consisting of FIGS. 2A, 2B, and 2C), exemplary output voltage (appearing across the electrical load) waveforms 200A are shown, during a voltage sag and subsequent to recovery from a voltage sag. Referring first to FIG. 2A, a voltage sag 206 ($V_{sag}$) is shown as exemplified by a drop in the input AC line voltage. During the occurrence of a voltage sag, a corrected output voltage 204 appears across the electrical load as a consequence of corrective actions taken by an embodiment of the sag corrector circuit, wherein the sag corrector includes a variable duty cycle boost converter to take the corrective actions. The operation of the variable duty cycle boost converter involves the sag corrector alternately providing boosting and gating pulses non-concurrently, during the occurrence of a voltage sag. As mentioned previously, such boosting and gating pulses are usually provided by control circuit 102 included in the sag corrector. Typically, and as shown, the gating pulses 106 and boosting pulses 104 fluctuate rapidly at frequencies of about 16-25 KHz. Therefore, at the time scale resolution shown in the illustrations in FIG. 2A, details of individual pulses are not viewable. Such details are shown next in magnified views in FIG. 2B and FIG. 2C for illustrating conditions during occurrence of a voltage sag and at the point of recovery from a voltage sag respectively.

Referring to FIG. 2B, a magnified view 200B of an exemplary corrected output voltage 204 that appears across the electrical load is shown, during the occurrence of a voltage sag. The corrected output voltage 204 is the outcome of the boost converter operation and resembles an upwardly rising "step-like" waveform that closely tracks the waveform of a desired output voltage ($V_{desired}$) 202. The desired output voltage ($V_{desired}$) 202 typically corresponds to a pre-stored desired template (e.g., a sequence of samples of a voltage profile) available to a control circuit (within the sag corrector circuit).

In one aspect, the corrected output voltage 204 appears across a capacitor Cf connected in parallel to the load (see FIG. 1 and FIG. 3). Further, as will occur to one skilled in the art, the corrected output voltage 204 appearing across the load is the result of corrective actions taken on the voltage sag 206 ($V_{sag}$) by the control circuit to achieve the (target) desired output voltage ($V_{desired}$) 202. As shown exemplarily in FIG. 2B, the start of voltage sag correction occurs a time instant 205, and continues until the circuit recovers from the voltage sag at a subsequent time instant 214. As will be understood by one skilled in the art, the control circuit 102 (in the sag corrector circuit) has to detect a voltage sag first (e.g., by comparing instantaneous values of the input AC line voltage with samples of a pre-stored desired template voltage as discussed in FIG. 5), and then start taking corrective action at time instant 205. In one embodiment, the voltage sag corrector detects a voltage sag at a time instant prior (e.g., at a previous zero crossing instant of the input AC line voltage) to time instant 205. The boost converter circuit 118 (shown in FIG. 1 and FIG. 3) is generally controlled by the control circuit 102 via gating pulses 106 and boosting pulses 104.

According to aspects of the present disclosure, the duty cycle of the boost converter 118 is calculated based on an instantaneous value of the input AC line voltage (e.g., a reduced value of the input AC line voltage as characterized by a voltage sag) and a desired (target) voltage, pre-stored within the memory of the control circuit 102. In other words, the amount of "boost" needed depends on the instantaneous value of the input AC line voltage and a pre-stored desired (target) voltage. Accordingly, the width of the gating and boosting pulses are varied (e.g., for how long they will be turned on) based on the calculated duty cycle. After the onset of a voltage sag and until the sag is over, the width (duration) of the gating pulse 106 controls the operation of the switch SB, and the width (duration) of the boosting pulse 104 controls the operation of the switch SA. For example, as shown in FIG. 2B, boosting pulse 104a is of a narrower width than the boosting pulse 104b, indicating the different amounts of boost needed at the respective time instances of providing boosting pulse 104a and boosting pulse 104b. Although not specifically indicated in FIG. 2B, it will be understood that the width (duration) of the gating pulse 106 also varies accordingly, because of the complementary sequence of operation of the gating and boosting pulses. (A state diagram representation of the boosting and gating phases is shown in connection with FIG. 4.)

According to the laws of electromagnetic induction and during the occurrence of a voltage sag, alternate switching (of switches SA and SB via boosting and gating pulses respectively) causes the inductor L1 (see FIG. 1 and FIG. 3) to charge and discharge repetitively. (In one aspect, and as discussed in FIG. 3, switch SA comprises a MOSFET switch and switch SB comprises a pair of MOSFET switches S1 and S2.) During a boosting phase, switch SA is turned on via a boosting pulse 104, causing energy to be stored in the inductor in the form of magnetic flux. During a successive gating phase, the control circuit 102 provides a gating pulse to the switch SA while the boosting pulse 104 is turned off. As a result, during the gating phase, the inductor discharges by transferring the stored energy to charge a capacitor Cf (see FIG. 1 and FIG. 3) connected across the load. Thus, the capacitor Cf charges during a gating phase and discharges (through the load) during a boosting phase so as to regulate (e.g., smoothen) the corrective voltage 204 appearing across the load during the occurrence of a voltage sag. In other words, the capacitor Cf charges during a gating phase and discharges during a boosting phase. Therefore, the inductor L1 and the capacitor Cf charge and discharge alternately. Specifically, when the inductor L1 is charging during a boosting phase, the capacitor Cf is discharging through the load. At a successive gating phase, the inductor discharges by transferring energy to the capacitor Cf. This charging/discharging of the inductor L1 during the boosting/gating phases via boosting/gating pulses results in the corrective voltage output ($V_{corrected}$) 204 to appear across the electrical load, as long as the voltage sag lasts. According to one aspect, during a voltage sag, the corrective voltage output 204 appearing across the load can be expressed as: $V_{corrected}=V_{sag}+(1-D)L1\,di/dt$, wherein during a voltage sag, $V_{sag}=V_{in}$, D=duty cycle of the switch SB, and i=current flowing through the inductor L1.

However, it will occur to one skilled in the art that precision control of the alternate turn on of the switches SA and SB (via boosting pulses 104 and gating pulses 106 respectively) is difficult to achieve. Moreover, in the event that switches SA and SB are both turned on at the same time, the voltage across the load might exceed safe limits. Thus, according to one aspect of the present disclosure, a predetermined delay is provided between gating and boosting pulses. In one example and as shown in FIG. 2B and FIG. 2C, the delay is approximately 100 nanoseconds, although this delay can vary. During this delay, current flowing through the inductor L1 is diverted into an energy clamp circuit 110.

The energy clamp circuit 110 (e.g., see FIG. 3) comprises a clamping capacitor, a diode, a MOSFET switch S4, and a resistor. Under normal operation, the clamping capacitor is charged to the peak of the line voltage, i.e. nominal voltage 210 as shown in FIG. 2B. In one aspect, during the occurrence of a voltage sag, the clamping capacitor gets charged when switches SA and SB are turned off, for example, during the predetermined delay between gating and boosting pulses. During this delay or dead time, the voltage (across the clamping capacitor) will typically rise above the nominal voltage, due to the current being diverted from the inductor L1, causing the clamping capacitor to get charged. Further, every time the sag corrector alternates between gating and boosting phases, the predetermined delay is provided, resulting in the clamping capacitor accumulating additional charge, as shown in FIG. 2B. Once the voltage across the clamping capacitor (a/k/a clamping capacitor voltage) reaches a predetermined threshold, the energy clamp circuit 110 provides clamping pulses 108a and 108b (e.g., to switch S4 in FIG. 3) to dissipate the energy stored in the clamping capacitor through resistor Rc. The voltage across the clamping capacitor is thus maintained between a nominal voltage 210 and a predetermined threshold (e.g., predetermined threshold clamping voltage Va) 208 at all times. Therefore, the energy clamp circuit 110 (included in the sag corrector circuit 100) functions as an "absorber" for excess electrical energy that needs to be dumped, thereby preventing voltages from becoming too large and damaging the connected devices.

In one exemplary aspect, the control circuit 102 provides clamping pulses 108 to the clamping capacitor after detection that the clamping capacitor voltage 212 has exceeded a predetermined threshold, which can occur during a voltage sag, or at the point of recovery from a voltage sag. In one exemplary embodiment, such clamping pulses 108 are provided regardless of the state of the boost converter, i.e. regardless of whether the boost converter is in a boosting phase or a gating phase.

Now referring to FIG. 2C, a magnified view of the corrected output voltage 104 is shown zoomed in at the point of recovery from a voltage sag. For example, it is shown that at time instance 214, the control circuit determines that the voltage sag is over. At this instance, clamping pulse 108c is provided by the control circuit to the clamp circuit after detection that the clamping capacitor voltage 212 has exceeded a predetermined threshold clamping voltage (Va) 208. At time instant 214, switch SB is turned back on via the gating pulse 106 and SA is off (i.e. the boosting pulse is off).

In the exemplary FIG. 2C, it will be observed that clamping pulse 108a (or 108b) is narrower than clamping pulse 108c implying that the energy stored in the clamping capacitor Cc at time instance 214 (i.e. at the point of recovery from voltage sag) is greater than a previous time instance in the middle of a voltage sag. Consequently, it takes a longer time to discharge the clamping capacitor Cc. This phenomenon is likely possible at the point of recovery from voltage sags when the energy stored in the clamping capacitor is further elevated because of nominal AC line voltage levels (which are greater than voltage values during a voltage sag) is added to the "boost voltage" resulting from the inductor L1.

It has been illustrated exemplarily in FIGS. 2B and 2C that three (3) clamping pulses (e.g., 108, 108b, and 108c) are provided to the energy clamp circuit 110 during the occurrence of a voltage sag, and another clamping pulse subsequent to recovery from a voltage sag. However, it will be understood that such illustrations are for purposes of example and explanation in this disclosure only. According to aspects of the present sag corrector, no limitation is imposed on the number of clamping pulses, particular instances at which they are provided by the control circuit, or even the duration of such clamping pulses. Details of an embodiment of the sag corrector circuit will be described in what follows next.

Now turning to FIG. 3, an embodiment 300 of a sag corrector circuit is shown. As shown, the disclosed sag corrector circuit connects the AC line voltage ($V_{in}$) 112 to the load 114. In the embodiment shown, the sag corrector circuit comprises a front end power protection circuit 116, a boost converter circuit 118, an energy clamp circuit 110, a capacitor Cf connected across the load 114, and a control circuit 102 (for controlling the operation of the power protection circuit 116 and the boost converter circuit 118 via control signals or pulses).

Typically, the front end power protection circuit 116 includes non-linear circuit components such as varistors and other circuit components for responding to power line disturbances such as over-voltages, sags, etc. According to one aspect, the front end power protection circuit 116 includes a MOV 1 with a higher voltage rating, a MOV2 with a lower voltage rating, and a relay R1 coupled between the two MOVs. In one aspect, the relay R1 is actuated by a control signal (not shown in FIG. 3) provided by a control circuit 102 (e.g., at least one microprocessor along with associated logic). The front end power protection circuit also includes a voltage monitoring terminal VM1 for monitoring (e.g., continually measuring) the input AC line voltage for voltage sags. In one aspect, such measurement is performed periodically by a control circuit 102. In parallel arrangement with the front end power protection circuit 116 is a capacitor C1. As will be understood, the capacitor C1 (in conjunction with other circuit components of FIG. 3) enables the sag corrector to provide functionalities of an EMI/RFI filter.

Coupled to the front end protection circuit 116 is a boost converter circuit 118 that comprises an inductor L1 connected (in series to the input AC line voltage) with an AC switch SB, and another AC switch SA. In one example, the AC switch SA comprises diodes D1-D4 (connected in a full bridge rectifier mode) in parallel arrangement with a MOSFET S3. The operation of the MOSFET S3 is controlled by the control circuit via boosting pulses 104. The switch SA is oriented in a manner such that one terminal (e.g., common to diodes D1 and D2) of the switch SA is connected to the inductor L1 and the other terminal (e.g., common to diodes D3 and D4) is connected in line with the neutral point of the input AC line voltage.

As shown in FIG. 3, the AC switch SB comprises MOSFETS (a/k/a MOSFET switches or simply, switches) S1 and S2 connected in anti-parallel arrangement with diodes D7 and D8. In one exemplary embodiment, the diodes D7 and D8 may be integrated with MOSFETS S1 and S2. MOSFETS S1 and S2 are controlled by the control circuit, in particular by the gating pulses 106. Under normal operating conditions (e.g., when no sags occur), the switch SA (specifically, MOSFET switch S3) is turned off (i.e., no boosting pulse 104 are provided), whereas the switch SB (specifically, MOSFET switches S1 and S2) is turned on via gating pulses 106, thereby allowing a direct connection between the AC line voltage ($V_{in}$) 112 and the load 114.

It will be understood and appreciated that MOSFETS typically have high surge current rating which makes them suitable for use in conditions when the load is subjected to high inrush currents, and obviates the requirement of bypass elements (e.g., thyristors) that would otherwise be required to handle over-current stresses. For example in FIG. 3, at power-up, the output voltage is connected to the load (via switches S1 and S2) at the zero crossing of the input AC line voltage, reducing the line inrush current flowing through the load.

Furthermore, connected in parallel to MOSFET switch S3 is an energy clamp circuit 110. In one aspect, the energy clamp circuit 110 comprises a clamping capacitor Cc, a diode D5, a MOSFET switch S4, and a resistor Rc. According to another aspect, the control circuit 102 provides a clamping pulse 108 to the energy clamp circuit 110 whenever the voltage (across the clamping capacitor Cc) reaches a predetermined threshold (e.g., threshold clamping voltage Va 208 shown in FIGS. 2B and 2C). This methodology of providing an "absorber" for excess electrical energy that needs to be dumped prevents voltages from becoming too large and damaging the connected devices. In one exemplary aspect, the control circuit 102 monitors (e.g., measures) the voltage across the clamping capacitor Cc (also referred to herein as the clamping capacitor voltage 212) at a terminal called VM2 as shown in FIG. 3.

Under normal operation, the clamping capacitor Cc is charged to the peak of the line voltage. In one aspect, during the occurrence of a voltage sag, the clamping capacitor gets charged when switches SA and SB are turned off, for example, during the predetermined delay between gating and boosting pulses. Consequently, the voltage (across the clamping capacitor) will typically rise above the nominal voltage, due to the current being diverted from the inductor L1, causing the clamping capacitor to get charged above the nominal voltage. Further, every time the sag corrector alternates between gating and boosting phases, the predetermined delay is provided, resulting in the clamping capacitor accumulating additional charge above the nominal voltage, as shown in FIG. 2B. During such instances, and according to aspects described herein, the control circuit 102 provides a clamping pulse 108 to the energy clamp circuit 110 (specifically, to the MOSFET switch S4). Once the voltage across the clamping capacitor (a/k/a clamping capacitor voltage) reaches a predetermined threshold, the clamping pulse 108 provided to switch S4 causes the energy stored in the clamping capacitor to be dissipated through resistor Rc. (See FIG. 2B for additional details.)

Again, when the circuit recovers from a voltage sag (i.e. switch SA is turned on via gating pulse 106 and switch SB is turned off), the excess energy in the inductor L1 is also diverted into the clamping capacitor in the energy clamp circuit 110. As a result, if the voltage across the clamping capacitor reaches a predetermined threshold, another clamping pulse 108 is provided to switch S4 so that the energy stored in the clamping capacitor is dissipated through resistor Rc. (See FIG. 2C for additional details.)

As will occur to one skilled in the art, the diode D5 in the energy clamp circuit 110 remains forward-biased relative to the electrical power supply such that the initially uncharged clamping capacitor Cc gets charged when the current flowing through inductor L1 (of the boost converter circuit 118) is diverted into the clamping capacitor Cc. But the diode D5 becomes reverse-biased once the clamping capacitor Cc gets charged, thereby preventing electrical charge stored in the clamping capacitor Cc from returning back to the AC line. Consequently, clamping pulses are provided by the control circuit 102 to the switch S4 so as to cause the capacitor to discharge through resistor Rc. Thus, the energy clamp circuit prevents a shoot-through of load voltage, during the occurrence of a voltage sag.

The resistor Rc in the energy clamp circuit 110 does not see any dissipation under normal conditions, but only when switch S4 is turned on as the result of the clamping capacitor voltage measured at VM2 being too high. Hence, the power dissipation rating of Rc can be relatively small. The clamping capacitor Cc also helps to limit the peak surge voltage that can be applied to the load. Thus, as will be understood, the diode D5 and the clamping capacitor Cc not only ensure that the output voltage does not exceed a desired value, but also ensures that current from the inductor L1 is diverted into the energy clamp circuit 110 when switches S1/S2 and S3 are transitioning. The voltage across the clamping capacitor Cc is regulated to a value marginally higher than the peak of the output voltage delivered to the load.

In one exemplary embodiment, the voltage across the clamping capacitor (a/k/a clamping capacitor voltage 212) is constrained to lie between nominal voltage 210 and a predetermined threshold clamping voltage (Va) 208 (see FIG. 2B and FIG. 2C for illustrative details). As a non-limiting example, for a capacitor Cc having a rating of 300V that is operating on a nominal RMS line voltage of 120V, (or equivalently, nominal peak line voltage=170V), the peak threshold clamping voltage Va=210V. In other words, the clamping capacitor voltage is allowed to fluctuate by 40V above its nominal peak value. The choice of the clamping capacitor Cc, thus arbitrarily depends on an allowable range of "safe" operation that is pre-decided by the circuit designer.

Still referring to FIG. 3, a capacitor Cf is connected parallel to the load 114 so as to regulate the corrected voltage appearing across the load, during the occurrence of a voltage sag. As mentioned previously, according to aspects of the sag corrector circuit 300, during the occurrence of a voltage sag, the inductor L1 (in the boost converter 118) discharges by transferring its stored energy to charge the capacitor Cf. In turn, the capacitor Cf discharges through the load 114. In other words, the capacitor Cf charges during a gating phase and discharges during a boosting phase. A state diagram representation of the boosting and gating phases is shown in connection with FIG. 4.

As shown in FIG. 3, the boost converter circuit 118 (connected in parallel to capacitor Cf) is generally controlled by the control circuit 102 via gating pulses 106 and boosting pulses 104. In particular, the gating pulse 106 controls the operation of switches S1 and S2, and the boosting pulse 104 controls the operation of the switch S3. Under normal operating conditions, the gating pulse 106 is turned on and the boosting pulses 104 is turned off. After a voltage sag is detected, the boost converter 118 is activated by alternately switching between gating and boosting phases. During a boosting phase, switch S3 is turned on via boosting pulse 104, causing energy to be stored in the inductor L1 in the form of magnetic flux. During a successive gating phase, the control circuit 102 provides gating pulses to the switches S1 and S2 while the boosting pulse 104 is turned off. As will be understood, the sequence of operation of switches S1, S2 along with switch S3 is in such a manner that the inductor L1 and the capacitor Cf charge and discharge alternately. Specifically, while the inductor L1 is charging during a boosting phase, the capacitor Cf (connected in parallel to the load 114) is discharging through the load 114. Similarly, the capacitor charges during a gating phase from the energy transferred by the inductor L1 to the capacitor Cf. Exemplary waveforms showing sequence of operation of the gating pulse 106 and boosting pulse 104 have been discussed in connection with FIG. 2A, FIG. 2B, and FIG. 2C. According to an aspect of the invention(s), the frequency of operation of the switches S1, S2 and the switch (S3) for boosting and coupling the boosted voltage to the electrical load is in the range of about 16 kHz to about 25 kHz, although other frequencies of operation may be selected depending on other operational parameters, as will be understood by those skilled in the art.

To ensure safe switching, a predetermined dead-time of typically around 100 nanoseconds is needed between turn-off of a switch and turn-on of an incoming switch, e.g., between successive boosting and gating pulses (see FIG. 2B and FIG. 2C) during a voltage sag. This reduces the possibility of a shoot-through or instability at the load, to reduce system losses, and to prolong the life of the switches. The actual duty cycle required is calculated by the control circuit 102 (e.g., a microprocessor therein) which looks at the input line voltage, compares this to a predetermined template desired output voltage, and calculates the duty cycle needed, and regulates the quantities via a control loop. In one embodiment, the sag corrector is typically designed only for short duration voltage sags, typically lasting for no more than 2-3 seconds.

As will be understood, if no voltage sags are detected in the input AC line voltage, the control circuit 102 in the sag corrector circuit keeps monitoring the input AC line voltage (e.g., at terminal VM1) with switches S1, S2 turned on, and switches S3, S4 turned off.

As will be understood, input AC line voltages are rated at 120 V, 240 V, or other voltages in conjunction with an associated current that depends on the current drawn by a particular type of connected load. As will be known by those skilled in the art, AC line power voltages depend on national standards that differ from one country to another, or even from one electronic device to another. It will be understood that embodiments of the present disclosure are applicable universally to all kinds of input AC line voltages, and not necessarily limited to 120V RMS (i.e., 170V peak), as discussed herein. Alternate embodiments of the disclosed sag corrector circuit can be designed as will be apparent to one skilled in the art. For example, although it is shown in FIG. 3 that the control circuit monitors the voltages at terminals VM1 and VM2 in the sag corrector circuit, in alternate embodiments, there can be other terminals (e.g., voltage appearing at the load) at which the control circuit can additionally monitor voltages/currents, as will occur to one skilled in the art.

Additionally, although not shown in FIG. 3, one or more power supplies may be involved in the operation of the control circuit 102. Further, although not shown in FIG. 3, one or more microprocessors or microcontrollers or any other type of state machine in combination with each other may be involved in the operation of the control circuit 102. A state diagram representing sequence of operation of various switches (via pulses provided by the control circuit 102) in the sag corrector embodiment shown in FIG. 3, will be described next.

With reference to FIG. 4, shown is a state diagram 400 that shows the sequence of operation of switches S1/S2 and S3 that relates to the steps of microprocessor logic executed within the control circuit 102.

The state diagram 400 includes a normal operating conditions state 404, a gating phase state 408, a boosting phase state 406, and a clamping phase state 410. After startup and assuming steady state has been reached, the control circuit 102 enters the normal operating conditions state 404. During this state, the capacitor Cf and the clamping capacitor Cc is fully charged to the peak of the input AC line voltage. As will be understood by one skilled in the art, the normal operating conditions state 404 represents a nominal state of the sag corrector circuit, when no overvoltages/voltage sags/transients occur, or after recovery from a voltage sag. If electrical power is lost while the control circuit is in any other state, the circuit reverts back to the normal operating conditions state 404. Also, during normal operating conditions state 404, the gating pulse 106 is provided to switches S1 and S2, to connect the load to the input AC line voltage.

Upon occurrence of a voltage sag, the state of the control circuit changes from the normal operating conditions state 404 to a boosting phase state 406. During the boosting phase state 406, the control circuit 102 provides boosting pulses 104 to MOSFET switch S3 while the switches S1 and S2 are turned off. This results in the load being disconnected from the input AC line voltage. Also, turning on of MOSFET switch S3 results in energy getting stored in the inductor L1 in the form of magnetic flux. During the boosting phase, the charged capacitor Cf discharges through the electrical load. As will be understood, the amount of "boost" needed in the boosting phase state 408 depends on the instantaneous value of the input AC line voltage and a pre-stored desired (target) voltage. Hence the duration of time for which the MOSFET switch S3 is turned on (a/k/a duty cycle of switch S3) depends on the instantaneous value of the input AC line voltage (e.g., a reduced value of the input AC line voltage as characterized by a voltage sag) and samples of a pre-stored desired (target) voltage.

As shown in FIG. 4, from the boosting phase state 406, the control circuit enters a gating phase state 408 during which the control circuit 102 provides the gating pulses 106 and the boosting pulses 104 are turned off. Hence, during the gating phase, the control circuit 102 provides a gating pulse 106 to MOSFET switches S1 and S2 while the switch S3 is turned off. During the gating phase, the inductor L1 discharges by transferring the stored energy to charge a capacitor Cf (see FIG. 1 and FIG. 3) connected across the load so as to regulate the corrected voltage 204 appearing across the load during the occurrence of a voltage sag. As will occur to one skilled in the art, the capacitor Cf and the inductor L1 follow a reverse order for charging/discharging.

According to aspects of the present disclosure, the boosting phase and the gating phase occur non-concurrently, alternately switching between the gating phase state 408 and the boosting phase state 406. Accordingly, after the onset of a voltage sag and until the sag is over, the width (duration) of the gating pulse 106 controls the operation of the switches S1 and S2 in the gating phase state 408, and the width (duration) of the boosting pulse 104 controls the operation of the switch S3 in the gating phase state 406.

However, it will occur to one skilled in the art that precision control of the alternate turning on of the switches between the boosting phase state 406 and the gating phase state 408 (via boosting pulses 104 and gating pulses 106 respectively) is difficult to achieve. Thus, according to one aspect of the present disclosure, a predetermined delay (i.e. dead time) is provided between the gating and boosting phases to ensure safe switching. During the delay, current flowing through the inductor L1 is diverted into the energy clamp circuit 110, particularly to the clamp capacitor Cc. Thus, the clamping capacitor Cc accumulates charge every time the circuit alternates between gating and boosting phases, or vice-versa.

It will also occur to one skilled in the art that the clamping capacitor's charge cannot increase in an unbounded manner, i.e. the voltage across the capacitor should be controlled to a value less than a predetermined threshold less than the voltage rating of the capacitor. Therefore, in one embodiment, a clamping phase state 410 is provided, during which switch S4 is turned on via clamping pulses, regardless of the condition of the switches S1, S2, and S3. In other words, it will be understood that the clamping phase state 410 can be independent (e.g., unrelated to gating and boosting phases), as shown in FIG. 4. During the clamping phase state 410, the control circuit 102 provides a clamping pulse 108 to the energy clamp circuit 110 (specifically to switch S4) whenever the voltage (across the clamping capacitor Cc) exceeds a predetermined threshold Va. As will be understood, the clamping pulse is provided to switch S4 so that the clamping capacitor Cc discharges through the resistor Rc. In one exemplary embodiment, the clamping capacitor discharges through the resistor Rc until the residual voltage in the clamping capacitor Cc reaches nominal voltage levels. (e.g., see FIG. 2B and FIG. 2C). (It will be recalled that under normal operation, the clamping capacitor Cc is charged to the peak of the line voltage, e.g., nominal voltage levels.)

In one exemplary aspect, the control circuit monitors the voltage across the clamping capacitor, e.g., as shown in FIG. 3. It will be understood that the sag corrector enters a clamping phase state whenever the voltage across the clamping capacitor Cc exceeds a predetermined threshold. In other words, it is possible that the clamping capacitor Cc exceeds a predetermined threshold during occurrence of a voltage sag, and also during a subsequent instance of recovery from a voltage sag. During such instances, and according to aspects described herein, the control circuit 102 provides a clamping pulse 108 to the energy clamp circuit 110 (specifically, to the MOSFET switch S4). (See FIG. 2B and FIG. 2C for illustrative examples of clamping pulses provided to switch S4 during a voltage sag, and another clamping pulse to switch S4 subsequent to recovery from a voltage sag.) From the clamping phase state 410, the sag corrector circuit enters a non-clamping phase state 412, during which the clamping pulses are turned off.

In one aspect, the control circuit keeps monitoring the input AC line voltage, e.g., at VM1 terminal in FIG. 3. In the event that the control circuit detects that the voltage sag has ended (voltage sag recovery), the sag corrector enters a normal operating conditions state 404, and normal conditions are restored (i.e. switches S1, S2 are on, switches S3, S4 are off). However, if the voltage sag has not ended, then after a predetermined delay (during which current from the inductor L1 is diverted into the clamping capacitor), the circuit enters a boosting phase state 406. As mentioned previously, the sag corrector alternates between a gating phase state 408 and a boosting phase state 406 with a predetermined delay in between the states. In one aspect, it will be understood that the normal operating conditions state 404 and the gating phase state 408 have similar configuration of switches, e.g., S1=ON, S2=ON, S3=OFF, S4=OFF. This usually happens at the point of recovery from a voltage sag. However, if a voltage sag is not over, then from the gating phase state 408, the control circuit enters a boosting phase state 406, as explained previously. Details of the control circuit logic will be explained in what follows next.

Now turning to FIG. 5, an exemplary microprocessor logic 500 is shown as steps of a flowchart, corresponding to the embodiment of the circuit 300 described earlier in FIG. 3. Particularly, it will be understood that the steps shown in FIG. 5 are included as a program included in a microprocessor or microcontroller contained in the control circuit 102. As used herein, the terms "microprocessor" and "microcontroller" are used interchangeably, it being understood that many different types of programmable microprocessors or microcontrollers may be utilized, provided that such devices can receive inputs representing the voltages measured as described herein for purposes of detecting a voltage sag or other power anomalies, and can provide outputs for controlling operation of the various switches and relays described herein. In particular, a microprocessor capable of determining the variable duty cycle for the boost converter is preferred. Further, a microprocessor capable of controlling the actuation and turnoff of the boost converter independently of control of the discharge of the clamping capacitor is preferred.

For the embodiment in FIG. 3, it is assumed that the Relay R1 is in the closed position. It will be additionally understood that in one embodiment, various method steps in the control logic can occur unrelated (e.g., concurrently) with various other method steps. For example, as shown in FIG. 5, steps 522, 524, 526, and 528 occur independently of steps 504, 506, 508, 510, 512, 514, 516, 518, and 520. Further details will be better understood from the description that follows.

As shown in FIG. 5, starting at step 502, the microprocessor powers on, or is reset from a prior shutdown mode. The initial conditions for the switches are: S1=ON, S2=ON, S3=OFF, S4=OFF. This switch configuration allows the input AC signal to pass through Relay R1 and Inductor L1, and across capacitor Cf, thereby charging the capacitor Cf to the nominal line voltage (e.g., 120V AC). Although the relay R1 is primarily used for protection against over voltages and various other power disturbances, the microprocessor logic 500 discussed herein does not explicitly specify protection against over voltages and various other power disturbances. Also, in addition to providing functionalities as described in the boost converter, the inductor L1, and capacitors C1 and Cf also operate as an EMI/RFI filter.

As mentioned previously, the switch configuration S1=ON, S2=ON, S3=OFF, S4=OFF is equivalent to the gating pulse 106 being turned on (by the control circuit 102), and the boosting pulse 104 being turned off. Also, under normal operating conditions, the clamp capacitor Cc (in clamp circuit 110) is charged to the nominal line voltage.

At step 504, the input AC line voltage at point VM1 is sampled with circuitry residing in the control circuit 102. Specifically, the microprocessor or some external circuitry is presented with a scaled down representation of the actual input AC line voltage as scaled by a voltage divider network or transformer. This scaled down voltage can be considered as a "representative AC voltage". For example, if the nominal input AC line voltage is 120V, for the microprocessor, an equivalent voltage scaled down voltage is for example 2V. Because of the one-to-one mapping between the "representative AC voltage" and the actual "input AC line voltage VM1 (a/k/a line voltage at VM1)", the above-mentioned voltages have been used herein synonymously. In one example, the microprocessor or other circuitry samples the input voltage VM1 at a specific sampling frequency (S) to generate a set of samples VM1=(VM1[1], VM1[2], VM1[3] . . . VM1[$n$]).

Then, the microprocessor determines (at step 506) whether or not VM1 matches a template set of pre-stored sample values $V_{desired}$=($V_{desired}$[1], $V_{desired}$[2], $V_{desired}$d[3], . . . $V_{desired}$ [n], . . . ) on a sample-by-sample basis. For example, the pre-stored template can be derived by sampling a representative target (i.e. a non-voltage sag) AC voltage starting at a zero crossing at the same sampling frequency (S). As will be understood, under normal operating conditions, the representative input voltage VM1[$n$] would equal its corresponding desired output voltage $V_{desired}$[n], or will be slightly deviated from $V_{desired}$[n]. However, under voltage sags, VM1[$n$] is typically less than $V_{desired}$[n], for several samples.

If the microprocessor determines (at step 506) that the present sample VM1[$n$] matches the expected desired pre-stored template sample $V_{desired}$[n], then the logic loops back to step 504 to take the next sample VM1[$n$+1]. If the microprocessor determines (at step 506) that the present VM1[$n$] sample (and a few previous samples) do not match the corresponding sample of the expected desired pre-stored template $V_{desired}$[n], then the microprocessor considers that the AC line input voltage is in a sag condition. As will be understood, the microprocessor determines a sag based on mismatch of a few samples of the VM1 voltage and the desired pre-stored template $V_{desired}$[n], so as to prevent nuisance detection of sags.

After a sag is detected, (at step 508), the microprocessor calculates the duty cycle (D) for the boost circuit based on the equation: D=1−(VM1[$n$]/$V_{desired}$[n]). At this point the gating pulse 106 turns off S1 and S2 disconnecting the load 114 from the input voltage $V_{in}$ 112 (at step 510). This isolates the boost converter circuit 118 from the load. Switches S3 and S4, as will be recalled, are already off.

In order to ensure safe switching, a predetermined delay or dead-time (e.g., approximately 100 nanoseconds) is provided next, before the boost converter circuit 118 is turned on. In the next step 514, switch S3 within the boost converter circuit 118 is turned on (by entering a boosting phase) via the boosting pulse 104 in order to charge the inductor L1. It will be understood that switch S3 is turned on for a specified time duration as determined by the duty cycle calculation performed in step 508. According to aspects of the present disclosure, the duty cycle of the boost converter 118 is regulated by varying the width of the boosting (and gating) pulses in a manner dependent on the instantaneous value of the input AC line voltage VM1 and the pre-stored desired (target) voltage $V_{desired}$. As will be recalled from the previous discussions, the control circuit operates the boost converter by alternately providing boosting and gating pulses non-concurrently. For example, if the duty cycle of the boosting pulses is D, then the duty cycle of the gating pulses is 1-D.

In step 516, switch S3 is turned off by turning off the boosting pulse 104. Again, a predetermined delay or dead-time as shown in step 518 is provided for protection of the components to improve robustness of the circuit. Next, in step 520, the gating pulse 106 turns on switches S1 and S2 for a duration of time based on the duty cycle (1-D).

As will be understood, during the predetermined delay excess current flowing through inductor L1 is diverted into the clamp circuit. Specifically, the current is diverted through diode D2, diode D5, and capacitor Cc, causing the voltage across Cc to rise above the nominal peak AC voltage. It will be recalled that under normal operation, the clamping capacitor Cc is charged to the peak of the line voltage.

According to aspects of the present disclosure, during a voltage sag, the sag corrector circuit alternates between boosting and gating phases, with the predetermined delay (e.g., as shown in steps 512 and 518) in between the phases. Thus, the clamping capacitor Cc accumulates charge every time the circuit alternates between gating and boosting phases, or vice-versa. In one aspect, the voltage across Cc (a/k/a clamping capacitor voltage 212) is maintained between a nominal voltage level and a higher threshold voltage (e.g., threshold clamping voltage Va 208) at all times. The steps performed by the control logic in maintaining the voltage across Cc between a nominal voltage level and a higher threshold voltage through an independent control loop (i.e., unrelated with the other control logic steps) is explained next.

The voltage across capacitor Cc is measured (at step 522) at terminal VM2 (e.g., shown in FIG. 3) by circuitry in the control circuit 102. The purpose of this measurement is to ensure that the voltage across Cc does not rise high enough to damage capacitor Cc, or the switches S1-S4. In step 524, the voltage measured in step 522 is compared to a predetermined threshold clamping voltage Va. The value of Va is determined appropriately by one skilled in the art. Exemplary values of Va and nominal voltage levels have been discussed previously in connection with FIG. 2.

If the measured voltage across Cc exceeds the predetermined threshold clamping voltage Va, then a clamping duration Tc is calculated at step 526. The clamping duration Tc is based on the value of the clamping resistor Rc as well as other factors know to those skilled in the art. Switch S4 is then turned on (step 528) in order to provide a path for excess voltage across capacitor Cc to be dissipated by resistor Rc. As will be recalled from previous discussions, switch S4 is turned on for the time Tc by providing a clamping pulse 108. In other words, after the time Tc, switch S4 is turned off. After a time Tc has elapsed, the microprocessor reverts back to step 522 where the clamp voltage across clamping capacitor is again measured (e.g., at terminal VM2).

If, on the other hand, at step 524 the microprocessor determines that the voltage across Cc at terminal VM2 did not exceed the predetermined threshold clamping voltage Va, then the logic loops back to step 522 where the clamp voltage at terminal VM2 is again measured. In one alternate embodiment, instead of calculating (in step 526) a clamping duration (Tc) based on the actual voltage across Cc, switch S4 can be turned on by a clamping pulse for a predetermined bleeding period (typically small). This predetermined bleeding period would allow reduction of small amounts of excess voltage from capacitor Cc by dissipation through resistor Rc. The logic would then loop back to step 522 to re-measure the voltage across Cc to determine if another predetermined bleeding period is necessary. If the microprocessor determines that the voltage across Cc is below the predetermined threshold clamping voltage Va, the logic would then loop back to step 522 as mentioned previously.

In the control logic embodiment shown in FIG. 5, it will be understood that the steps 522, 524, 526, and 528 are performed by the control circuit occur concurrently with the other steps of the flowchart. In other words, the steps 522, 524, 526, and 528 are a part of a clamping phase that is unrelated (e.g., occurs independently) to the other steps in the control logic. A state diagram of such an embodiment was discussed earlier in connection with FIG. 4. However, in some embodiments, it is possible that the steps 522, 524, 526, and 528 are linked to other steps in the control logic.

From the description of the exemplary flowchart in FIG. 5, it will be understood that in one aspect, the microprocessor does not need to separately determine a condition of voltage sag recovery. This is because, in the discussed example, the microprocessor alternates between a boosting phase state and a gating phase state repetitively while the sag lasts, with a predetermined delay between the states. Finally, it transitions into the normal operating conditions state from a gating phase state. During both the normal operating conditions state and the gating phase state, switches S1, S2 are on and S3 is off.

It will be apparent to one skilled in the art that in alternate embodiments, the sag corrector circuit can be designed with different circuit components, and have different configurations of switches, as will occur to one skilled in the art. For example, control circuit 102 can be designed using two microprocessors that mutually communicate with each other via an isolated optocoupler. In one exemplary aspect, one microprocessor controls switches S1, S2, and S3, whereas the other microprocessor controls switch S4.

Aspects of the present disclosure relate to devices and methods that provide voltages temporarily to a load during momentary electrical disturbances in the power supply line, and more particularly an apparatus that compensates for voltage sags by using a variable duty cycle boost converter to boost the line voltage to pre-determined desired voltage levels during occurrence of voltage sags. As mentioned previously, embodiments of the sag corrector circuit can be integrated with power protection functions. In addition to being relatively inexpensive, the integrated approach to implementing power protection and ride-through provides several benefits. The need to impede or eliminate current inrush following a voltage-sag is reduced. When needed, switches S1 and S2 can be turned on at zero crossing of the input AC line voltage to reduce inrush currents. Relay R1 provides cut-off under dangerous over-voltage and under-voltage conditions. Switches S1, S2 can also be used to isolate the load from the input AC line voltage in the event of a short circuit. The clamping capacitor Cc provides voltage clamping to limit voltage excursions at the end of a voltage sag, but also limits the peak 'let-through' voltage of the protection circuit to transient voltage surges. Additionally, embodiments of the sag corrector circuit provide ride through for the voltage sags.

The flowchart of FIG. 5 shows the architecture, functionality, and operations of exemplary logic implemented by the control circuit in the circuits shown in FIGS. 1 and 3. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Various functions and steps described previously can be implemented as a circuit or state machine that employs anyone of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Also, where the microprocessor logic comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the microprocessor logic for use by or in connection with the instruction execution system. The computer readable medium can comprise anyone of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for providing temporary electrical power to a load connected to an input AC line voltage during a voltage sag, comprising:
    a selectively variable voltage boost converter including a pulse-width modulated inductance for providing a boosted voltage to the load, the boost converter operative when actuated to provide a boosted voltage as a function of instantaneous value of the input AC line voltage compared to a desired nominal AC line voltage;
    a circuit for detecting a voltage sag in the input AC line voltage corresponding to a value in a predetermined range of values in the input AC line voltage less than the nominal voltage for the input AC line voltage and for actuating the boost converter to provide a boosted voltage at a value that increases the voltage provided to the load in response to detecting the voltage sag, for detecting when the voltage sag is over, and for deactuating the boost converter when the voltage sag is over;
    a switch for coupling the input AC line voltage to the electrical load during normal operating conditions and for coupling the boosted voltage from the boost converter to the electrical load in response to detection of a voltage sag and actuation of the boost converter; and
    a clamping circuit coupled to the boost converter for clamping excess voltage from the inductance in the boost converter when the boost converter is deactuated in response to detection that the voltage sag is over.

2. The system of claim 1, wherein the switch is a first switch, and wherein the boost converter comprises an inductor coupled in series with the first switch to disconnect the input AC line voltage from the load during inductor charging during a boost phase, and further comprising a second switch coupled to provide a path of low resistance to ground to charge the inductor.

3. The system of claim 1, further comprising a component for determining an amount of boost correction for the boost converter based on the difference between a value of the input AC line voltage and the nominal voltage; and
    wherein the boost converter is operative to provide the boosted voltage as a function of said determined difference.

4. The system of claim 1, wherein the voltage sag in the input AC line voltage comprises a plurality of values in the predetermined range of values less than nominal voltage.

5. The system of claim 1, further comprising a programmed microcontroller for controlling the boost converter, detecting the voltage sag and when the voltage sag is over, and for controlling the switch.

6. The system of claim 5, wherein the voltage sag is determined based on a comparison of a set of values of the input AC line voltage to a pre-stored template representing a voltage sag, and
    wherein the pre-stored template is stored in the microcontroller.

7. The system of claim 1, wherein the clamping circuit comprises a clamping capacitor, a diode, a semiconductor switch, and a discharge resistance.

8. The system of claim 1, wherein the switch is operative to couple the input AC line voltage to the electrical load during normal conditions on the input AC line voltage; and
    wherein in response to detection of a voltage sag, the switch is operative to disconnect the input AC line voltage from the electrical load during a charging operation of the boost converter.

9. The system of claim 8, wherein the boost converter is actuated subsequent to disconnection of the input AC line voltage from the electrical load after detection of the voltage sag.

10. The system of claim 8, wherein the disconnecting the input AC line voltage, actuating the boost converter, and coupling the boosted voltage to the electrical load during the duration of the voltage sag are repeated at a predetermined frequency during the voltage sag.

11. The system of claim 1, wherein in response to detection of the end of a voltage sag, the switch is operative to disconnect the boost converter from the electrical load to isolate the boost converter from the electrical load, turn off the boost converter subsequent to disconnection of the boost converter from the electrical load, and couple to the boost converter to the clamping circuit to absorb excess voltage from the boost converter upon turn off of the boost converter.

12. The system of claim 11, further comprising a component for imposing a predetermined delay after disconnecting the boost converter before reconnecting the input AC line voltage to the electrical load,
    whereby any excess voltage from the boost converter is diverted to the clamping circuit.

13. The system of claim 1, wherein the switch is operative to reconnect the input AC line voltage to the electrical load after excess voltage from the boost converter has been diverted to the clamping circuit in response to the detection of the end of the voltage sag.

14. The system of claim 1, further comprising a sensor for detecting the instantaneous value of the voltage at the clamping circuit; and further comprising a fourth switch (S4) for discharging the clamping circuit in response to detection that the voltage on the clamping circuit has exceeded a predetermined threshold value.

15. The system of claim 1, further comprising a control circuit operative for receiving signals from a first voltage sensor coupled to input AC line voltage, detecting the occurrence of a voltage sag based on the signal from the first voltage sensor, for actuating the boost converter to provide the boosted voltage, for detecting the end of the voltage sag based on the signal from the first voltage sensor, and for turning off the boost converter in response to detection of the end of the voltage sag.

16. The system of claim 15, further comprising a second voltage sensor coupled to detect the voltage on the clamping circuit, and wherein the control circuit is operative for discharging the clamping circuit in response to a signal from a second voltage sensor indicating that the voltage on the clamping device has exceeded a predetermined threshold value.

17. The system of claim 1, wherein the clamping circuit comprises a diode with its cathode coupled to the clamping capacitor and a discharge resistor Rc coupled from a terminal of the clamping capacitor through a fourth switch (S4); and
wherein the clamping capacitor is discharged when the fourth switch is closed.

18. The system of claim 17, wherein boost converter provides boosted voltage to the electrical load independently of discharge of the clamping circuit.

19. The system of claim 1, further comprising a circuit for controlling the boost converter to provide a variable boost as a function of the difference between the input AC line voltage and the nominal AC line voltage.

20. The system of claim 19, wherein the variable boost is provided by varying the duty cycle of the boost converter with pulse width modulation (PWM).

21. The system of claim 1, further comprising:
control circuit;
a first voltage sensor coupled to the control circuit for detecting the input AC line voltage;
a second voltage sensor coupled to the control circuit for detecting the voltage on the clamping circuit;
a first switch (S1, S2) for connecting the input AC line voltage and the boosted voltage from the boost converter to the load;
a third switch (S3) for coupling an inductor in the boost converter to a potential for charging the inductor;
a fourth switch (S4) coupled to the clamping circuit for discharging the clamping circuit; and
wherein the control circuit provides outputs for controlling the first switch (S1, S2) and the third switch (S3) for charging the boost converter and coupling the boosted voltage to the electrical load, and the fourth switch (S4) for discharge of the clamping circuit.

22. The system of claim 21, wherein the control circuit comprises a programmed microcontroller that controls the operation of the first switch (S1, S2) and the third switch (S3) for boosting the voltage independently of control of the fourth switch (S4) for discharge of the clamping circuit.

23. A method for providing temporary electrical power to a load connected to an input AC line voltage during a voltage sag, comprising the steps of:
detecting a voltage sag in the input AC line voltage corresponding to a value in a predetermined range of values in the input AC line voltage less than a nominal voltage for the input AC line voltage;
in response to detecting the voltage sag, actuating a selectively variable voltage boost converter that includes a pulse-width modulated inductance to provide a boosted voltage to the load, the boost converter operative when actuated to provide a boosted voltage as a function of instantaneous value of the input AC line voltage compared to a desired nominal AC line voltage;
detecting the end of the voltage sag; and
in response to detecting that the voltage sag is over, deactuating the boost converter and clamping excess voltage from the inductance in the boost converter to a clamping circuit so as to prevent the excess voltage from being transmitted to the load.

24. The method of claim 23, wherein the boost converter comprises an inductor coupled in series with a first switch to disconnect the input AC line voltage from the load during inductor charging, and a second switch coupled to provide a path of low resistance to ground for charging the inductor.

25. The method of claim 23, further comprising the step of determining an amount of boost correction based on the difference between a value of the input AC line voltage and the nominal voltage; and
activating the boost converter to provide the boosted voltage as a function of said determined difference.

26. The method of claim 23, wherein the voltage sag in the input AC line voltage comprises a plurality of values in the predetermined range of values less than nominal voltage.

27. The method of claim 23, wherein the voltage sag is determined based on a comparison of a set of values of the input AC line voltage to a pre-stored template representing a voltage sag.

28. The method of claim 27, wherein the pre-stored template is stored in a microcontroller utilized to control the system.

29. The method of claim 23, further comprising the step of charging a capacitor connected across the load that supplies electrical power to the load during a voltage sag.

30. The method of claim 23, wherein the clamping circuit comprises a clamping capacitor, a diode, a semiconductor switch, and a discharge resistance.

31. The method of claim 23, further comprising the steps of:
coupling the input AC line voltage to the electrical load during normal conditions on the input AC line voltage;
in response to detection of a voltage sag, disconnecting the input AC line voltage from the electrical load during a charging operation of the boost converter.

32. The method of claim 31, wherein the step of actuating the boost converter is conducted subsequent to disconnection of the input AC line voltage from the electrical load after detection of the voltage sag.

33. The method of claim 31, wherein the steps of disconnecting the input AC line voltage, actuating the boost converter, and coupling the boosted voltage to the electrical load during the duration of the voltage sag are repeated at a predetermined frequency during the voltage sag.

34. The method of claim 23, wherein the step of turning off the boost converter and clamping excess voltage comprises:
in response to detection of the end of a voltage sag, disconnecting the boost converter from the electrical load to isolate the boost converter from the electrical load;
subsequent to disconnecting the boost converter from the electrical load, turning off the boost converter; and
coupling to the boost converter to the clamping device to absorb excess voltage from the boost converter upon turn off of the boost converter.

35. The system of claim 34, further comprising the step of imposing a predetermined delay after disconnecting the boost converter before reconnecting the input AC line voltage to the electrical load,
whereby any excess voltage from the boost converter is diverted to the clamping circuit.

36. The method of claim 23, further comprising the step of reconnecting the input AC line voltage to the electrical load after excess voltage from the boost converter has been diverted to the clamping device in further response to the detection of the end of the voltage sag.

37. The method of claim 23, further comprising the steps of:
detecting the instantaneous value of the voltage at the clamping circuit; and in response to detection that the voltage on the clamping circuit has exceeded a predetermined threshold value, discharging the clamping circuit.

38. The method of claim 23, wherein steps of the method are effected by a control circuit operative for receiving signals from a first voltage sensor and a second voltage sensor, detecting the occurrence of a voltage sag based on the signal from the first voltage sensor, for actuating the boost converter to provide the boosted voltage, for detecting the end of the voltage sag based on the signal from the first voltage sensor, and for turning off the boost converter in response to detection of the end of the voltage sag.

39. The method of claim 38, wherein the control circuit is further operative for discharging the clamping circuit in response to a signal from a second voltage sensor indicating that the voltage on the clamping device has exceeded a predetermined threshold value.

40. The method of claim 23, wherein the clamping circuit comprises a diode with its cathode coupled to the clamping capacitor and a discharge resistor Rc coupled from a terminal of the clamping capacitor through a fourth switch (S4); and
further comprising the step of discharging the clamping capacitor when the fourth switch is closed.

41. The method of claim 40, wherein the steps of providing the boosted voltage to the electrical load via the boost converter and the steps of discharging the clamping circuit are carried out independently.

42. The method of claim 23, further comprising the step of controlling the boost converter to provide a variable boost as a function of the difference between the input AC line voltage and the nominal AC line voltage.

43. The method of claim 42, wherein the variable boost is provided by varying the duty cycle of the boost converter with pulse width modulation (PWM).

44. The method of claim 23, wherein the method is carried out in part with a control circuit that receives inputs from a first voltage sensor and a second voltage sensor, and provides outputs for controlling a first switch (S1, S2) and a third switch (S3) for charging the boost converter and coupling the boosted voltage to the electrical load, and a fourth switch (S4) for controlling discharge of the clamping circuit.

45. The method of claim 44, wherein the control circuit comprises a programmed microcontroller that controls the operation of the first switch (S1, S2) and the third switch (S3) for boosting the voltage independently of control of the fourth switch (S4) for discharge of the clamping circuit.

46. A system for providing temporary electrical power to an electrical load connected to an input AC line voltage during a voltage sag, comprising:
a selectively variable voltage boost converter including a pulse-width modulated inductor for providing a boosted voltage to the electrical load in response to actuation the boost converter operative when actuated to provide a boosted voltage as a function of instantaneous value of the input AC line voltage compared to a desired nominal AC line voltage;
a clamping device coupled to the boost converter for absorbing excess voltage from the inductance in the boost converter upon turn off of the boost converter;
a first voltage sensor for detecting the instantaneous value of the input AC line voltage;
a second voltage sensor for detecting the instantaneous value of the voltage at the clamping device;
a first switch (S1, S2) for coupling the input AC line voltage to the electrical load during normal conditions on the input AC line voltage, for disconnecting the input AC line voltage during charging of the boost converter, and for coupling the boost converter to the electrical load after charging;
a third switch (S3) operative in alternation with the first switch for coupling the boost converter inductor through a low resistance to ground to charge the inductor;
a fourth switch (S4) for coupling the clamping device through a discharge resistor (Rc) in response to detection that the voltage on the clamping device has exceeded a predetermined threshold value; and
a control circuit for receiving signals from the first voltage sensor and the second voltage sensor, for detecting the occurrence of a voltage sag based on the signal from the first voltage sensor, for actuating the boost converter to provide the boosted voltage, for activating the first switch to couple the input AC line voltage to the electrical load during normal conditions on the input AC line voltage, for activating the third switch for charging the inductor in the boost converter, for detecting the end of the voltage sag based on the signal from the first voltage sensor, for deactuating the boost converter in response to detection of the end of the voltage sag, and for activating the fourth switch to discharge the clamping device in response to the signal from the second voltage sensor indicating that the voltage on the clamping device has exceeded the predetermined threshold value.

47. The system of claim 46, wherein the clamping device comprises a clamping capacitor coupled to receive and absorb excess voltage from the boost converter.

48. The system of claim 47, wherein the clamping device further includes a diode with its cathode coupled to the clamping capacitor, and a discharge resistor Rc coupled from a terminal of the clamping capacitor through the fourth switch (S4) to ground for discharging the clamping capacitor when the fourth switch is closed.

49. The system of claim 46, further comprising a diode bridge for rectifying the output voltage from the boost converter that is coupled in parallel with the third switch, so as to charge the clamping device to the nominal voltage level during normal operations.

50. The system of claim 46, wherein the control circuit operates the fourth switch (S4) independently of the first switch (S1, S2) and the third switch (S3) to discharge the clamping device when the voltage across the clamping device exceeds a predetermined maximum value.

51. The system of claim 46, further comprising a front end protection circuit for the apparatus.

52. The system of claim 51, wherein the front end protection circuit comprises a first MOV and a parallel second MOV coupled to the input AC line voltage, and a relay coupled between the first MOV and the second MOV, and
wherein the control circuit is operative to open the relay to protect the system in response to detection of an overvoltage.

53. The system of claim 52, wherein the overvoltage is detected by the first voltage sensor.

54. The system of claim 46, wherein the control circuit is operative to control the boost converter to provide a variable boost as a function of the difference between the input AC line voltage and the nominal AC line voltage.

55. The system of claim 54, wherein the variable boost is provided by varying the duty cycle of actuation of the first switch (S1, S2) and the third switch (S3).

56. The system of claim 46, wherein the control circuit comprises a microcontroller including inputs for the first voltage sensor and the second voltage sensor, and provides outputs for controlling first switch (S1, S2), the third switch (S3), and the fourth switch (S4).

57. The system of claim 56, wherein the microcontroller controls the operation of the first switch (S1, S2) and the third switch (S3) for boosting the voltage independently of control of the fourth switch (S4) for discharge of the clamping device.

58. The system of claim 46, wherein the control circuit is further operative for disconnecting the boost converter via the first switch (S1, S2) prior to reconnecting the input AC line voltage to the electrical load, and for imposing a predetermined delay after disconnecting the boost converter from the electrical load before reconnecting the input AC line voltage to the electrical load,
whereby any excess voltage from turning off the boost converter is diverted to the clamping device.

59. A method for providing temporary electrical power to an electrical load connected to an input AC line voltage during a voltage sag, comprising:
coupling the input AC line voltage to the electrical load during normal conditions on the input AC line voltage;
detecting the instantaneous value of the input AC line voltage;
in response to detection of a voltage sag, disconnecting the input AC line voltage from the electrical load;
subsequent to disconnection of the input AC line voltage from the electrical load after detection of the voltage sag, turning on a selectively variable voltage boost converter including a pulse-width modulated inductor to provide a boosted voltage to the electrical load, the boost converter operative when actuated to provide a boosted voltage as a function of instantaneous value of the input AC line voltage compared to a desired nominal AC line voltage;
coupling a boosted voltage from the boost converter to the electrical load after charging of the boost converter;
repeating the steps of disconnecting the input AC line voltage, turning on the boost converter, and coupling the boosted voltage to the electrical load during the duration of the voltage sag;
in response to detection of the end of the voltage sag, disconnecting the boost converter from the electrical load to isolate the boost converter from the electrical load;
subsequent to disconnecting the boost converter from the electrical load, turning off the boost converter;
coupling a clamping device to the boost converter to absorb excess voltage from the inductor in the boost converter upon turn off of the boost converter;
in further response to the detection of the end of the voltage sag, reconnecting the input AC line voltage to the electrical load after excess voltage from the boost converter has been diverted to the clamping device;
detecting the instantaneous value of the voltage at the clamping device; and
in response to detection that the voltage on the clamping device has exceeded a predetermined threshold value, discharging the clamping device through a discharge resistor (Rc).

60. The method of claim 59, wherein the step of detecting the instantaneous value of the input AC line voltage is effected with a first voltage sensor.

61. The method of claim 59, wherein the step of detecting the instantaneous value of the voltage at the clamping device is effected with a second voltage sensor.

62. The method of claim 59, wherein the step of coupling the input AC line voltage to the electrical load during normal conditions on the input AC line voltage is effected with a first switch (S1, S2).

63. The method of claim 62, wherein the step of turning on a selectively actuatable boost converter comprises turning on a third switch (S3) to provide a path of low resistance to ground for an inductor in the boost converter while the first switch is turned off.

64. The method of claim 62, wherein the first switch (S1, S2) is operative for coupling the input AC line voltage to the electrical load during normal conditions on the input AC line voltage, for disconnecting the input AC line voltage during charging of the boost converter, and for coupling the boost converter to the electrical load after charging.

65. The method of claim 62, wherein the first switch (S1, S2) and the third switch (S3) operate in alternation to charge an inductor in the boost converter and to couple the boosted voltage from the inductor to the electrical load after charging.

66. The method of claim 65, wherein the frequency of operation of the first switch (S1, S2) and the third switch (S3) for boosting is in the range of about 16 kHz to about 25 kHz.

67. The method of claim 59, wherein steps of the method are effected by a control circuit operative for receiving signals from a first voltage sensor and a second voltage sensor, detecting the occurrence of a voltage sag based on the signal from the first voltage sensor, for activating the boost converter to provide the boosted voltage, for detecting the end of the voltage sag based on the signal from the first voltage sensor, for turning off the boost converter in response to detection of the end of the voltage sag, and for discharging the clamping device in response to the signal from the second voltage sensor indicating that the voltage on the clamping device has exceeded the predetermined threshold value.

68. The method of claim 59, wherein the clamping device comprises a clamping capacitor coupled to receive and absorb excess voltage from the boost converter.

69. The method of claim 68, wherein the clamping device further includes a diode with its cathode coupled to the clamping capacitor, and a discharge resistor Rc coupled from a terminal of the clamping capacitor through a fourth switch (S4) to ground for discharging the clamping capacitor when the fourth switch is closed.

70. The method of claim 59, further comprising the step of rectifying the output voltage from the boost converter so as to charge the clamping device to the nominal AC input voltage level during normal operations.

71. The method of claim 59, wherein steps of providing the boosted voltage to the electrical load via the boost converter and the steps of discharging the clamping device are carried out independently.

72. The method of claim 59, further comprising the step of protecting a system practicing the method from overvoltages occurring on the input AC line voltage.

73. The method of claim 72, wherein the step of overvoltage protection comprises:
providing a first MOV and a parallel second MOV coupled to the input AC line voltage, and a relay coupled between the first MOV and the second MOV, and
opening the relay to protect the system in response to detection of an overvoltage.

74. The method of claim 59, further comprising the step of controlling the boost converter to provide a variable boost as a function of the difference between the input AC line voltage and the nominal AC line voltage.

75. The method of claim 74, wherein the variable boost is provided by varying the duty cycle of the boost converter with pulse width modulation (PWM).

76. The method of claim 59, wherein the method is carried out in part with a control circuit that receives inputs from a first voltage sensor and a second voltage sensor, and provides outputs for controlling a first switch (S1, S2) and a third switch (S3) for charging the boost converter and coupling the boosted voltage to the electrical load, and a fourth switch (S4) for controlling discharge of the clamping device.

77. The method of claim 76, wherein the control circuit comprises a programmed microcontroller that controls the operation of the first switch (S1, S2) and the third switch (S3) for boosting the voltage independently of control of the fourth switch (S4) for discharge of the clamping device.

78. The method of claim 59, wherein the step of disconnecting the boost converter from the electrical load and turning off the boost converter is effected prior to the step of reconnecting the input AC line voltage to the electrical load, and further comprising the step of imposing a predetermined delay after disconnecting the boost converter from the electrical load before reconnecting the input AC line voltage to the electrical load, whereby any excess voltage from turning off the boost converter is diverted to the clamping device.

* * * * *